(12) United States Patent
Ishida et al.

(10) Patent No.: US 7,041,412 B2
(45) Date of Patent: May 9, 2006

(54) NON-AQUEOUS ELECTROLYTE SECONDARY BATTERY

(75) Inventors: Sumihito Ishida, Mino (JP); Shoichiro Watanabe, Nara (JP); Isao Mochida, Fukuoka (JP); Takashi Takeuchi, Hirakata (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 542 days.

(21) Appl. No.: 10/199,721

(22) Filed: Jul. 19, 2002

(65) Prior Publication Data

US 2003/0049519 A1   Mar. 13, 2003

(30) Foreign Application Priority Data

Jul. 23, 2001 (JP) ............................. 2001-221990
Aug. 31, 2001 (JP) ............................. 2001-264096

(51) Int. Cl.
*H01M 10/52* (2006.01)
(52) U.S. Cl. ...................................... 429/57
(58) Field of Classification Search .............. 429/7, 429/8, 13, 48, 49, 50, 57, 58, 59, 62, 303, 429/309, 337, 346
See application file for complete search history.

(56) References Cited

U.S. PATENT DOCUMENTS 4,269,905 A * 5/1981 Wedlake .................... 429/8
6,503,657 B1 * 1/2003 Takami et al. ............ 429/188

FOREIGN PATENT DOCUMENTS

| CN | 1298212 A | 6/2001 |
|---|---|---|
| EP | 1 107 336 A2 | 6/2001 |
| EP | 1107336 A2 * | 6/2001 |
| JP | 06-267593 A | 9/1994 |
| JP | 09-180760 A | 7/1997 |
| JP | 11-054154 A | 2/1999 |
| JP | 11-191400 A | 7/1999 |
| JP | 11-224670 A | 8/1999 |
| JP | 2000-090971 A | 3/2000 |

* cited by examiner

*Primary Examiner*—Michael Barr
*Assistant Examiner*—Robert Hodge
(74) *Attorney, Agent, or Firm*—Akin Gump Strauss Hauer & Feld, LLP

(57) ABSTRACT

In a non-aqueous electrolyte secondary battery having: an electrode plate assembly including a positive electrode, a negative electrode, and a separator interposed between the positive electrode and the negative electrode; a non-aqueous electrolyte including a lithium salt and a non-aqueous solvent; and a gas absorbing element that absorbs gas produced in the secondary battery, wetting of the gas absorbing element with the non-aqueous solvent is controlled.

23 Claims, 11 Drawing Sheets

F I G. 1
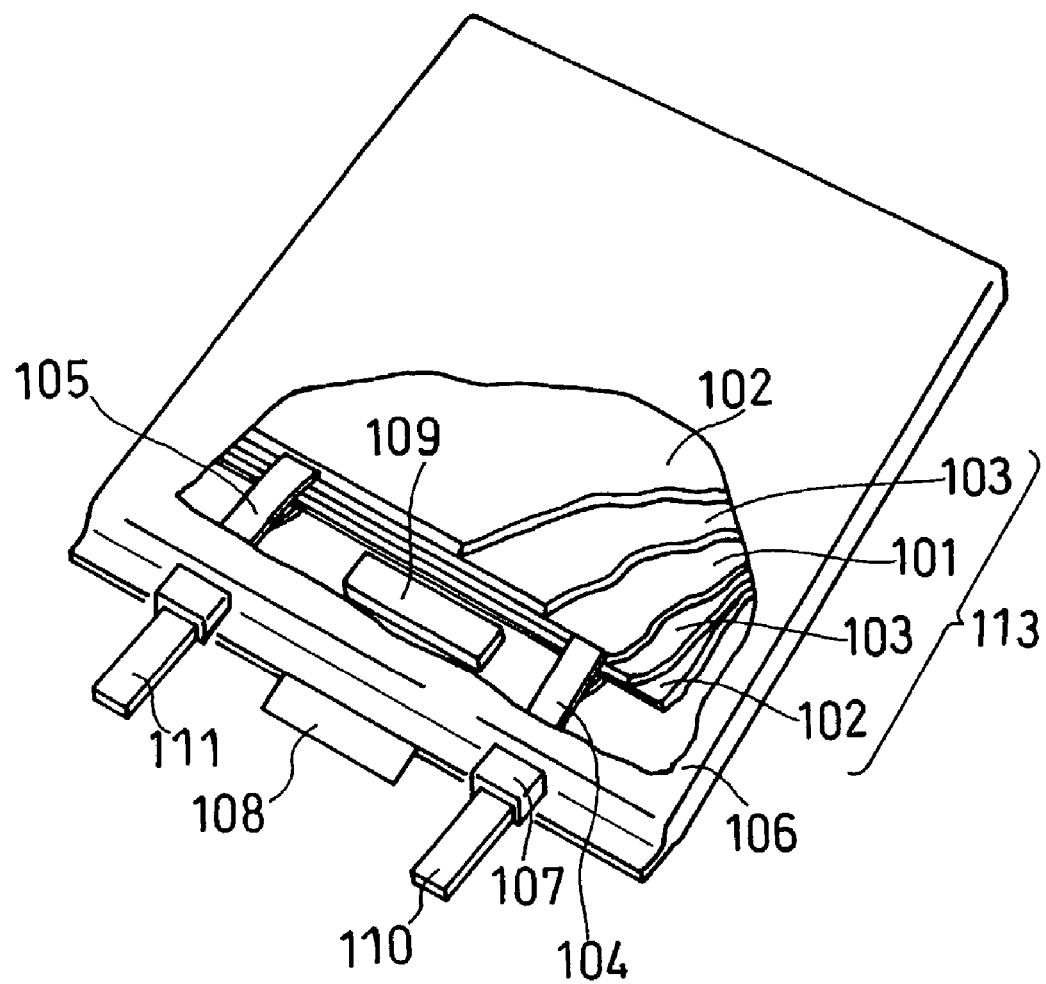

F I G. 1 4
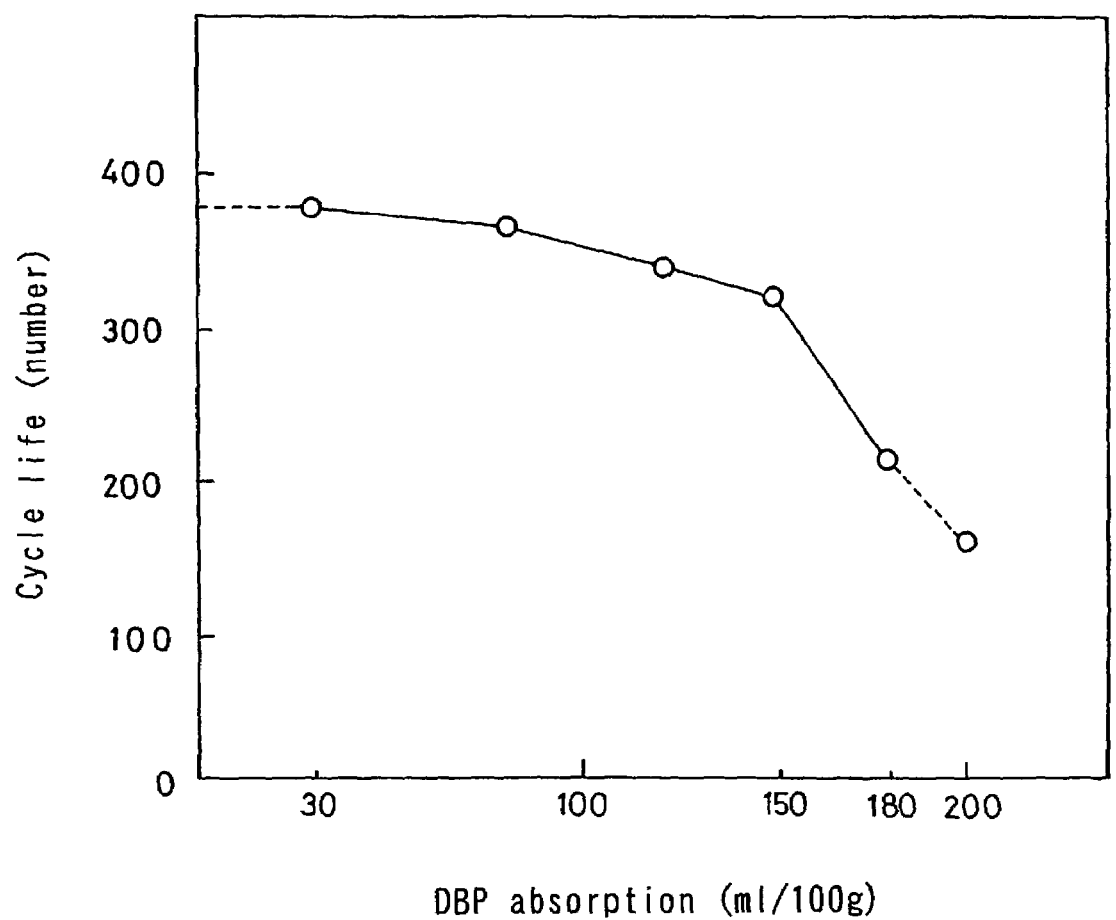

FIG. 16
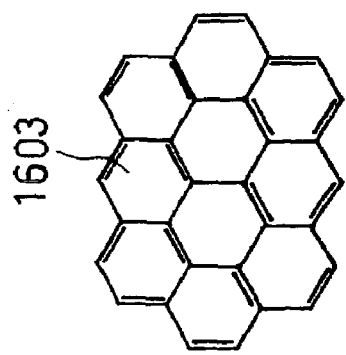
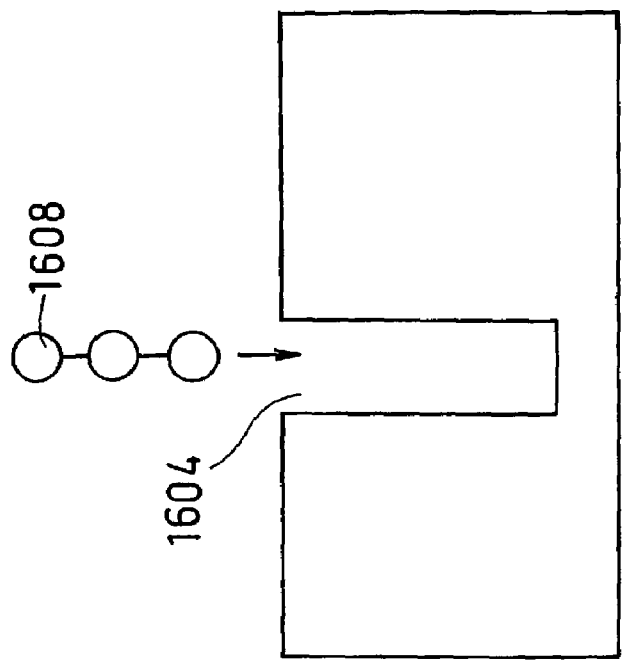
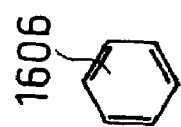
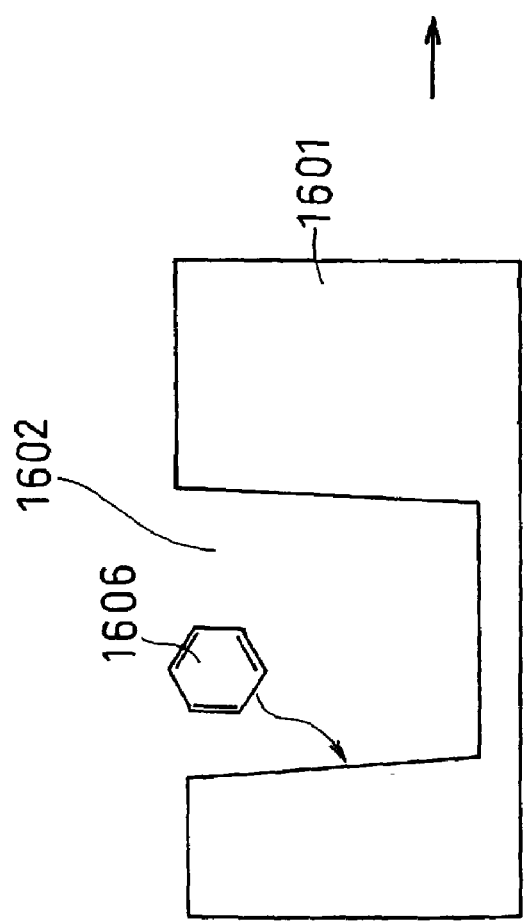

NON-AQUEOUS ELECTROLYTE SECONDARY BATTERY

BACKGROUND OF THE INVENTION

Non-aqueous electrolyte secondary batteries of high energy density have widely been used with the cordless and portable trend of AV equipment, personal computers, and other electronic apparatuses. Especially lithium secondary batteries are most advanced in practical use. The non-aqueous electrolyte secondary battery has a high electromotive force of approximately 4 V and a high energy density exceeding 350 Wh/L.

Available examples of the non-aqueous electrolyte secondary battery include cylindrical batteries and rectangular batteries. In the cylindrical batteries, a positive electrode plate and a negative electrode plate are wound via a separator and are accommodated, together with a non-aqueous electrolyte in a cylindrical case. In the rectangular batteries, an electrode plate assembly wound in a flat-sided shape is accommodated in a thin rectangular case.

Polymer secondary batteries have recently been in practical use. In the polymer secondary batteries, a stack of electrode plates obtained by interposing a polymer electrolyte between adjoining electrode plates is wrapped with a laminate sheet of a resin film and a metal foil. A gel electrolyte including a non-aqueous liquid electrolyte kept in a polymer matrix is applied for the polymer electrolyte.

The non-aqueous electrolyte secondary battery has high electromotive force, so that the non-aqueous solvent in the electrolyte is readily decomposed. Decomposition of the non-aqueous solvent causes generation of gas, for example, $CH_4$, $C_2H_4$, $C_2H_6$, CO, $CO_2$, and $H_2$, inside the battery. Methane and carbon dioxide are primary components of the gas.

The production of the gas is accelerated when the battery is kept at high temperatures for a long time period, is used at high temperatures, or is overcharged. The produced gas raises the internal pressure of the battery and may deform or damage the case. The produced gas also accelerates deterioration of the battery characteristics. Especially in the case of the polymer secondary battery, the bulge due to the produced gas causes the polymer electrolyte to be peeled off the electrode plate, and deteriorates the characteristics to the fatal level.

By taking into account generation of the gas due to decomposition of the non-aqueous solvent, the battery is provided with a safety valve that is activated at a preset pressure or a safety mechanism that detects the pressure and cuts off the electric current. An increase in internal pressure of the battery, however, causes frequent activation of the safety valve, which leads to release of the components of the electrolyte as well as the gas and thereby badly affects electronic apparatuses. The high working pressure of the safety valve, on the other hand, leads to easy deformation of a battery case.

In the non-aqueous electrolyte secondary battery containing the non-aqueous solvent, decomposition of the non-aqueous solvent is inevitable. Means for solving the above problems have thus been highly demanded. The following techniques have been proposed to control an increase in internal pressure of the battery due to the produced gas:

(i) Japanese laid-open patent publication No. 6-267593 discloses a battery including a substance capable of absorbing the produced gas or a substance reacting with the gas. This also discloses a positive electrode and a negative electrode with such a substance applied on the surface thereof, as well as a separator with such a substance contained therein.

(ii) Japanese laid-open patent publication No. 11-191400 discloses a multi-layered battery having gas blocking property and rigidity. This battery has a plastic inner housing, and includes a moisture absorbent or a gas absorbent, for example, any of silica gel, zeolite, active carbon, metal salts like stearates, hydrosulfites, and hydrogen absorbing alloys.

(iii) Japanese laid-open patent publication No. 9-180760 shows a mechanism of making the gas produced inside the battery, for example, hydrogen, methane, ethane, and carbon monoxide, electrochemically react with oxides or Ketchen Black added to the electrode plates.

(iv) Japanese laid-open patent publication No. 11-224670 describes that carbon materials, such as active carbon or carbon black have a capacity of absorbing carbon dioxide, carbon monoxide, nitrogen, and argon.

(v) Japanese laid-open patent publication No. 11-54154 discloses a battery including an alkali earth metal oxide (for example, SrO, CaO, BaO, or MgO) for fixation of carbon dioxide. Any of these oxides may be used in a powdery form or as a molded article.

(vi) Japanese laid-open patent publication No. 2000-90971 discloses a positive electrode including active carbon as a gas absorbent and a lithium-containing transition metal oxide.

As described above, diverse efforts have been made to control the increasing internal pressure of the battery due to the produced gas and prevent the resulting decrease in reliability in the non-aqueous electrolyte secondary battery.

The prior art technique, however, does not attain long-term stable control of the increasing internal pressure of the battery. This is because the conventional gas absorbent is readily wetted (excessively wetted) with the non-aqueous solvent of the non-aqueous electrolyte. The excessive wetting of the conventional gas absorbent with the non-aqueous solvent extremely lowers the capacity of gas absorption. Functional groups, such as carbonyl group, carboxyl group, aldehydes group, and hydroxide group are present on the surface of active carbon and carbon black and are expected to accelerate the wetting. Active carbon, for example, is manufactured by firing natural fiber material or synthetic fiber material at relatively low temperatures of 350 to 650° C., which suppress crystallization of carbon, and reforming (activating) the fired fiber material with an acid, an alkali, steam, or zinc chloride. The reforming process increases the surface area of the carbon material, while forming a large number of the functional groups.

Any of the conventional gas absorbents has poor capacity of absorbing methane and carbon dioxide. Since methane and carbon dioxide are the primary components of the gas produced in the battery, only the material having sufficient capacity of absorbing these gases can effectively prevent an increase in internal pressure of the battery.

The battery is generally manufactured in the air or nitrogen, so that the gas absorbent is sealed in the battery after absorption of the air or nitrogen to its saturated level. The gas absorbent that has already absorbed a large quantity of the air or nitrogen can not sufficiently absorb the gas produced in the battery. From the viewpoint of attaining the enhanced productivity and the less scattering and loss of organic solvents, however, it is extremely difficult to manufacture the battery under reduced pressure, with a view to preventing the gas absorbent from absorbing the air or nitrogen.

BRIEF SUMMARY OF THE INVENTION

The object of the present invention is thus to control wetting of a gas absorbent with a non-aqueous solvent and ensure long-term, stable action of the gas absorbent, thus enhancing the reliability of a non-aqueous electrolyte secondary battery. The object of the present invention is also to use a gas absorbent, which is not readily wetted with a non-aqueous solvent and has a capacity of selectively absorbing methane or carbon dioxide, thus enhancing the reliability of a non-aqueous electrolyte secondary battery.

The present invention is accordingly directed to a non-aqueous electrolyte secondary battery, which comprises: an electrode plate assembly including a positive electrode, a negative electrode, and a separator interposed between the positive electrode and the negative electrode; a non-aqueous electrolyte including a lithium salt and a non-aqueous solvent; and a gas absorbing element capable of absorbing gas produced in the secondary battery. The gas absorbing element includes a gas absorbent and a lyophobic agent against the non-aqueous solvent.

The gas absorbent is capable of absorbing, for example, at least one gas selected from the group consisting of methane, ethane, ethylene, carbon dioxide, and hydrogen. It is preferable that the gas absorbent comprises at least one selected from the group consisting of carbon materials, zeolite, metals, metal oxides, metal nitrides, and intermetallic compounds.

The lyophobic agent may comprise a polymer material as discussed later. It is preferable that dibutyl phthalate absorption of the lyophobic agent is not greater than 150 ml/100 g.

In one preferable application, the gas absorbing element comprises a powdery mixture including the gas absorbent and the lyophobic agent. A content of the lyophobic agent in the powdery mixture is preferably 2 to 30 parts by weight relative to 100 parts by weight of the gas absorbent. It is preferable that dibutyl phthalate absorption of the powdery mixture is not greater than 150 ml/100 g. The gas absorbing element may be either one of a molded article and a sintered article of the powdery mixture.

In another preferable application, a difference between surface free energy of the gas absorbing element and surface free energy of the non-aqueous electrolyte is 5 to 50 mN/m at 20° C. For example, it is preferable that a difference between surface free energy of the molded article or the sintered article and surface free energy of the non-aqueous electrolyte is 5 to 50 mN/m at 20° C.

In still another preferable application, the gas absorbing element has a porous layer that prevents the gas absorbent from being wetted excessively by the non-aqueous electrolyte, and the porous layer comprises the lyophobic agent. It is preferable that the porous layer covers over the gas absorbent.

A difference between surface free energy of the porous layer and surface free energy of the non-aqueous electrolyte is preferably 5 to 50 mN/m at 20° C. It is desirable that at least either one of the gas absorbent and the porous layer is a molded article or a sintered article.

In another preferable application, the gas absorbing element is a coating film that is formed on a surface of a constituent of the battery and includes the gas absorbent and the lyophobic agent. In still another preferable application, the gas absorbing element has a coating film that is formed on a surface of a constituent of the battery and includes the gas absorbent, and a porous layer that includes the lyophobic agent and covers over the coating film.

In one preferable embodiment, the electrode plate assembly is wound, and the gas absorbing element is serving as a core of the wound electrode plate assembly.

In one preferable example, when the electrode plate assembly is accommodated in a rectangular case, the gas absorbing element has a plate-like form and is serving as the core. It is preferable that an additional gas absorbing element comprising a coating film including the gas absorbent and the lyophobic agent is provided on the inner face of the flat rectangular case.

In another preferable example, when the electrode plate assembly is accommodated in a cylindrical case, the gas absorbing element has a bar-like form and is serving as the core. It is preferable that an additional gas absorbing element comprising a coating film including the gas absorbent and the lyophobic agent is provided on the inner face of the cylindrical case.

In another preferable application, the gas absorbing element is fixed to a sealing plate, which seals an opening of a casing for accommodating the electrode plate assembly therein.

The present invention is also directed to a non-aqueous electrolyte secondary battery, which comprises: an electrode plate assembly including a positive electrode, a negative electrode, and a separator interposed between the positive electrode and the negative electrode; a non-aqueous electrolyte including a lithium salt and a non-aqueous solvent; and a gas absorbing element capable of absorbing gas produced in the secondary battery, wherein the gas absorbing element comprises a gas absorbent capable of selectively absorbing at least one selected from the group consisting of carbon dioxide and methane. The gas absorbent may be included, for example, in at least either one of the positive electrode and the negative electrode.

It is preferable that the gas absorbent has a specific surface area of 300 to 1500 $m^2/g$, and that a ratio of number of oxygen atoms to number of carbon atoms in the gas absorbent, that is, O/C ratio, is not greater than 0.1.

It is also preferable that a content of the gas absorbent in the battery is not less than 0.2 g per 1000 mAh of cell capacity.

The present invention is further directed to a method of manufacturing a non-aqueous electrolyte secondary battery. The method includes the steps of: (1) utilizing powdery carbon material to prepare a gas absorbent capable of selectively absorbing at least one selected from the group consisting of carbon dioxide and methane; (2) preparing an electrode material mixture including the gas absorbent and an electrode active material and applying the electrode material mixture on a collector to obtain an electrode; and (3) assembling the electrode, a separator, and a non-aqueous electrolyte to a non-aqueous electrolyte secondary battery.

In one preferable application, the step (1) heats the powdery carbon material in a benzene atmosphere at 600 to 1000° C., so as to make benzene chemically adsorbed on the powdery carbon material. It is preferable that the benzene atmosphere is a gaseous mixture atmosphere containing nitrogen and 1 to 10% by volume. of benzene. It is also preferable that the gaseous mixture has a pressure of $1 \times 10^5$ to $2 \times 10^5$ Pa.

In another preferable application, the step (1) heats the powdery carbon material in an inert atmosphere at 600 to 1300° C. for 10 to 120 minutes.

It is preferable that the powdery carbon material is at least one selected from the group consisting of carbon black and active carbon. It is also preferable that the powdery carbon material has a specific surface area of 50 to 1500 $m^2/g$.

While the novel features of the invention are set forth particularly in the appended claims, the invention, both as to organization and content, will be better understood and appreciated, along with other objects and features thereof, from the following detailed description taken in conjunction with the drawings.

BRIEF DESCRIPTION OF THE SEVERAL VIEWS OF THE DRAWING

FIG. 1 is a partly omitted, oblique view illustrating a thin polymer battery in accordance with the present invention;

FIG. 14 is a graph showing the cycle life of the battery plotted against the DBP absorption of a powdery mixture in a charge-discharge cycle test of batteries $Lb_n$ in Example 4;

FIG. 16 shows a process of forming pores that selectively take in carbon dioxide;

DETAILED DESCRIPTION OF THE INVENTION

Embodiment 1

Figure 2:
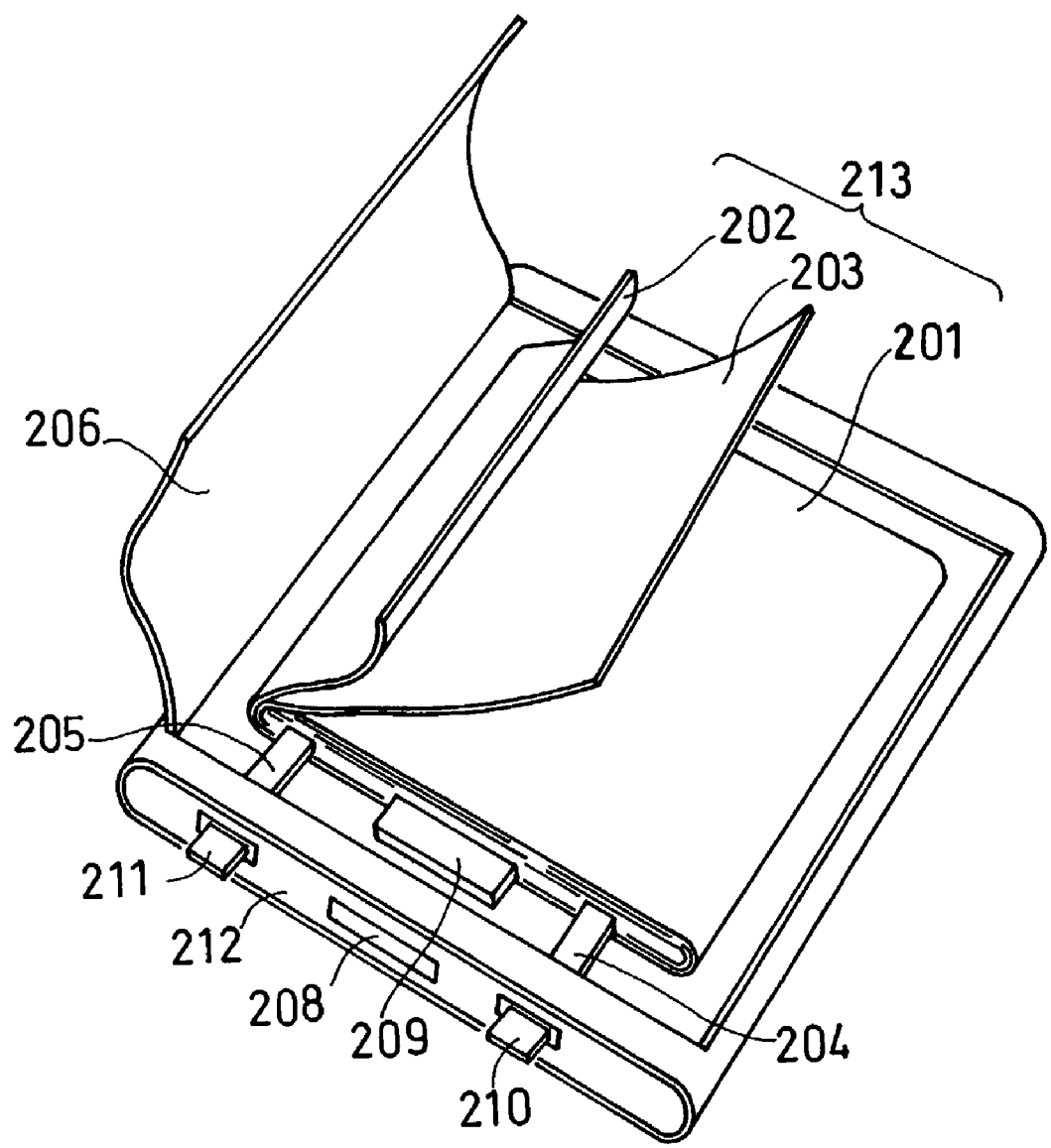
FIG. 2 is a partly decomposed view illustrating a rectangular battery in accordance with the present invention.

In this embodiment, a gas absorbing element comprises a powdery mixture including a gas absorbent and a lyophobic agent against a non-aqueous solvent.

It is preferred that the gas absorbent selectively absorbs decomposed gas components of the non-aqueous solvent. The decomposed gas includes methane, ethane, ethylene, carbon dioxide, and hydrogen. Carbon dioxide and methane are especially abundant.

The shape and the particle size of the gas absorbent may be set arbitrarily. For example, the gas absorbent having a mean particle diameter of 10 to 500 μm is available. Typical examples of such gas absorbent include carbon materials, zeolite, metals, metal oxides, metal nitrides, and intermetallic compounds. Especially preferable are carbon materials.

The carbon material may be active carbon or carbon black. The carbon material may be reformed to a gas absorbent that preferentially absorbs methane and carbon dioxide by heat treatment at 600 to 1300° C. or by heat treatment in a flow of benzene at 600 t 1300° C. as discussed later.

Zeolite may be molecular sieves or the like. Typical examples of the metal oxide include aluminum oxide and silica. Typical examples of the metal and the intermetallic compound include palladium, nickel, $LaNi_5$, MgNi, and TiFe.

The lyophobic agent prevents the gas absorbent from being wetted with a non-aqueous solvent and thereby enables the gas absorbent to have the long-term stable capacity of gas absorption. The affinity of the lyophobic agent to the non-aqueous solvent is evaluated by dibutyl phthalate (hereinafter referred to as DBP) absorption. The DBP absorption represents a quantity of DBP absorbed by 100 g of the lyophobic agent. The DBP absorption is obtained by soaking the powdery lyophobic agent in DBP, removing excess DBP, measuring the weight of the DBP-containing lyophobic agent, and calculating a difference between the observed weight and the original weight of the powdery lyophobic agent. The less DBP absorption shows the higher lyophobic property. In order to sufficiently prevent the gas absorbent from being wetted with the non-aqueous solvent, the DBP absorption of the lyophobic agent is preferably not greater than 150 ml/100 g.

Typical examples of the lyophobic agent include polyethylene, polypropylene, polytetrafluoroethylene, polyvinylidene fluoride, polyacrylonitrile, polyimide, copolymer of ethylene and propylene, copolymer of ethylene and vinyl acetate, copolymer of tetrafluoroethylene and hexafluoropropylene, copolymer of styrene and butadiene (hereinafter referred to as SBR), and terpolymer of ethylene, propylene, and vinyl acetate. Any of these polymers may be used alone or in combination. Especially preferable are polyethylene, polypropylene, polytetrafluoroethylene, polyvinylidene fluoride, polyacrylonitrile, polyimide, copolymer of tetrafluoroethylene and hexafluoropropylene, and SBR. Any of these lyophobic agents is available in a powdery form. The lyophobic agent has a mean particle diameter of, for example, 0.5 to 10 μm.

In order to prevent the non-aqueous solvent from reaching the gas absorbent while allowing the gas produced inside the battery to reach the gas absorbent, a gas passage should be formed among the particles of the lyophobic agent or among the particles of the lyophobic agent and the particles of the gas absorbent. One preferable state is mutual dispersion of the particles of the gas absorbent and the particles of the lyophobic agent, which is attained by mixing the powdery gas absorbent with the powdery lyophobic agent. Another preferable state is that primary particles or secondary particles of the gas absorbent are coated with fine powder of the lyophobic agent.

A V-shaped blender or a high-speed jet blender is more desirably used, than a mixing module for kneading the gas absorbent and the lyophobic agent, to prepare the gas absorbing element having adequate lyophobic property and gas permeability. Such blenders enable the surface of the gas absorbent particles to be coated with the fine particles of the lyophobic agent, without damaging the shape of the particles. Another available process is soaking the gas absorbent in an emulsion or dispersion of the lyophobic agent and drying the soaked gas absorbent to make the fine particles of the lyophobic agent deposit on the surface of the gas absorbent particles.

Still another applicable process is soaking the gas absorbent in a solution of the lyophobic agent and drying the soaked gas absorbent to coat the surface of the gas absorbent particles with the film of the lyophobic agent. Another applicable process is soaking the gas absorbent in a solution of a starting monomer or oligomer of the lyophobic agent and polymerizes the monomer or oligomer to coat the surface of the gas absorbent particles with the film of the lyophobic agent. In the case of mixing a polyvinylidene fluoride-containing solution with the gas absorbent, coexistence of polyethylene, polypropylene, SBR or the like in the solution is desirable.

For the adequate lyophobic property and gas permeability of the gas absorbing element, the powdery mixture of the gas absorbent and the lyophobic agent preferably has DBP absorption of not greater than 150 ml/100 g. The DBP absorption may be varied according to the mixing state of the powdery mixture.

The powdery mixture of the gas absorbent and the lyophobic agent is preferably molded. Sintering the molded article of the powdery mixture gives the gas absorbing element having excellent lyophobic property and sufficiently high strength.

A binding agent may be added to the powdery mixture of the gas absorbent and the lyophobic agent according to the requirements. Typical examples of the binding agent include polyolefin, carboxymethyl cellulose, and polyvinylidene fluoride.

It is preferable that a difference between surface free energy of the molded or sintered gas absorbing element and surface free energy of a non-aqueous electrolyte used for the battery is 5 to 50 mN/m at 20° C. For example, the non-aqueous electrolyte is obtained by dissolving $LiPF_6$ in a 1:1 (volume ratio) solvent mixture of ethylene carbonate and diethyl carbonate to a concentration of 1 mol/liter.

FIG. 1 is a partly omitted, oblique view illustrating a thin polymer battery in accordance with the present invention, which includes a gas absorbing element. In this polymer battery, an electrode plate assembly 113 including a positive electrode plate 101 interposed between a pair of negative electrode plates 102 via separators 103 is accommodated in a laminate film case 106 comprising a resin and aluminum. A positive electrode lead 104 is connected to the positive electrode plate 101, whereas a negative electrode lead 105 is connected to the negative electrode plate 102. Each lead is drawn out of the opening of the case 106 via a hot melt resin 107. The outer ends of the respective leads form a positive electrode outer terminal 110 and a negative electrode outer terminal 111. A resin film 108 functioning as a safety valve is provided between the positive electrode lead 104 and the negative electrode lead 105 at the opening of the case 106. There is a relatively weak joint between the resin film 108 and the inner face of the case. The joint surface is peeled off to release the gas to the outside with an increase in internal pressure of the battery. In the structure of FIG. 1, a gas absorbing element 109 formed in a rectangular solid is located in a space between the electrode plate assembly 113 and the opening of the case 106. This structure ensures effective use of the space inside the battery.

FIG. 2 is a partly decomposed view illustrating a rectangular battery including a gas absorbing element. In this battery, an electrode plate assembly 213 including a positive electrode plate 201 and a negative electrode plate 202 laid one upon the other via a separator 203 and rolled to a flat-sided shape is accommodated in a thin case 206. A positive electrode lead 204 is connected to the positive electrode plate 201, whereas a negative electrode lead 205 is connected to the negative electrode plate 202. The outer ends of the respective leads form a positive electrode outer terminal 210 and a negative electrode outer terminal 211. A plate-like gas absorbing element 209 is serving as a core of the electrode plate assembly 213. In the rectangular battery, the opening of the case 206 is sealed with a sealing plate 212 having a safety valve 208. The safety valve 208 is, for example, a clad plate having a crack. The crack opens to release the gas to the outside when the internal pressure of the battery reaches or exceeds a preset value.

Figure 3:
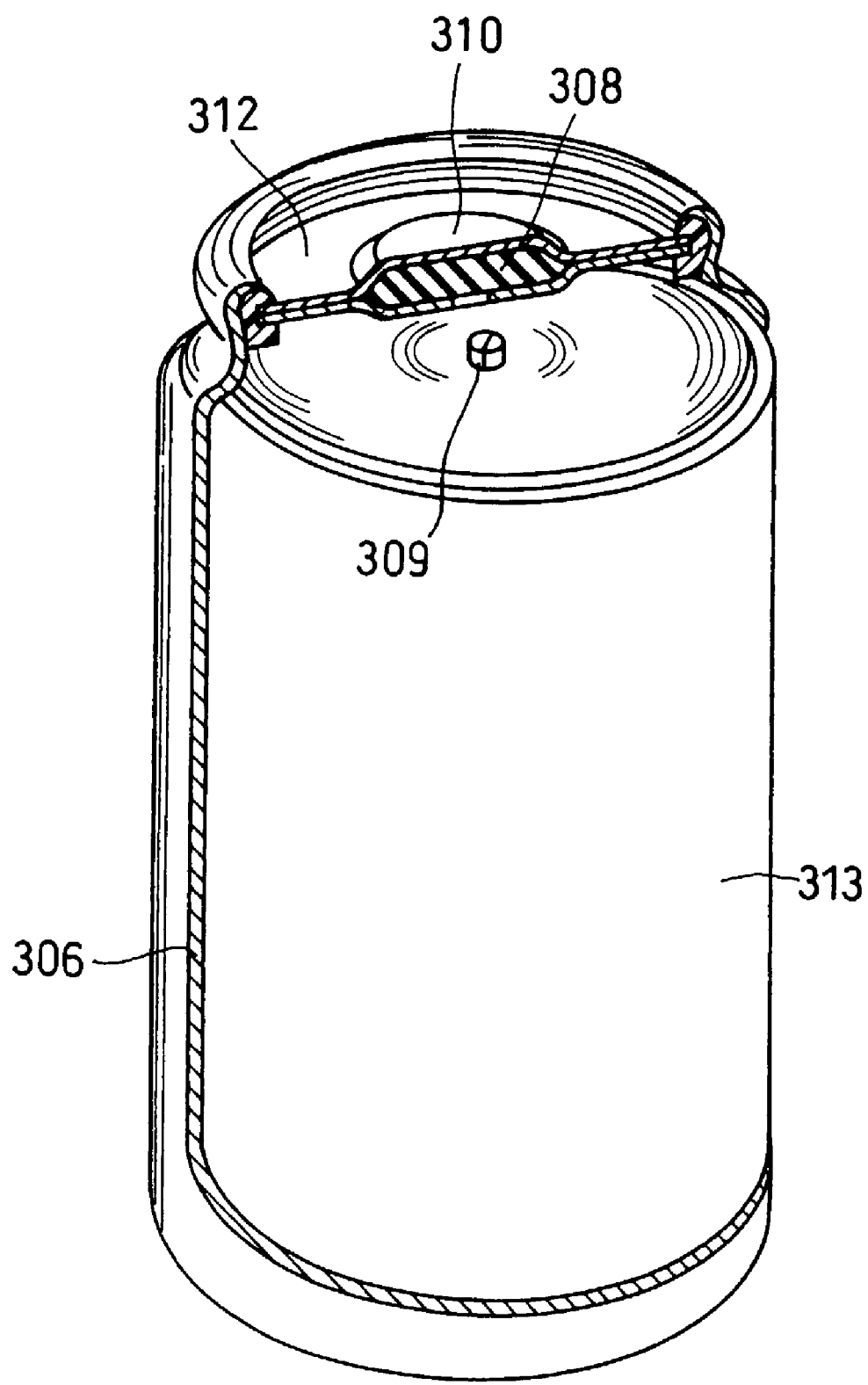
FIG. 3 is a partly omitted, oblique view illustrating a cylindrical battery in accordance with the present invention.

FIG. 3 is a partly omitted, oblique view illustrating a cylindrical battery including a gas absorbing element. In this battery, an electrode plate assembly 313 including a positive electrode plate and a negative electrode plate laid one upon the other via a separator and wound in a cylindrical shape is accommodated in a cylindrical case 306. A bar-like gas absorbing element 309 is serving as a core of the electrode plate assembly 313. The opening of the case 306 is sealed with a sealing plate 312 having a safety valve and a positive electrode outer terminal 310. The safety valve is, for example, a rubber valve 308. The rubber valve 308 closes an aperture formed in the sealing plate to connect the inside with the outside of the battery. When the internal pressure of the battery reaches or exceeds a preset value, the rubber valve 308 is deformed to release the gas to the outside. In the illustration of FIGS. 1 through 3, a non-aqueous electrolyte is omitted. In the illustration of FIG. 3, the positive electrode lead is omitted.

In the batteries having the wound electrode plate assembly as shown in FIGS. 2 and 3, application of the gas absorbing element for the core of the electrode plate assembly ensures effective use of the space inside the battery and is advantageous in the following points. Application of the gas absorbing element for the core facilitates the winding process of the electrode plates and prevents deformation of the electrode plate assembly, thus being advantageous in manufacture and improving the characteristics of the battery. This also readily attains the uniform distance between the positive electrode plate and the negative electrode plate in the electrode plate assembly, thus significantly enhancing the cycle property. Under application of a large shock on the battery, the gas absorbing element located on the center of the electrode plate assembly is broken to form a large number of short circuits. The electric current is thus not concentrated on one short circuit and thereby enhances the safety.

Any suitable gas absorbing element other than those discussed above may be applied for the thin polymer battery, the rectangular battery, and the cylindrical battery.

Figure 4:
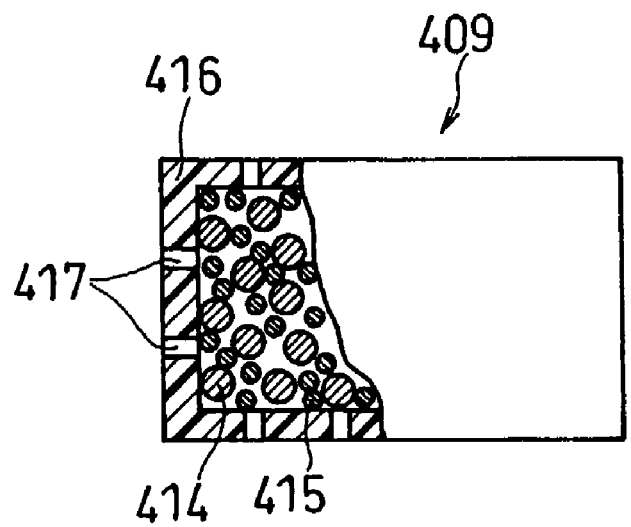
FIG. 4 is a partly omitted, front view illustrating a gas absorbing element, which comprises a powdery mixture including a gas absorbent and a lyophobic agent.

FIG. 4 shows a gas absorbing element 409, which includes a powdery mixture of a gas absorbent 414 and a lyophobic agent 415 and a container 416 for accommodating the powdery mixture therein. A gas passage 417 should be formed in the container 416. The case 416 may be made of any arbitrary material, but a material having resistance against the non-aqueous electrolyte, for example, a fluorocarbon resin like polytetrafluoroethylene is preferable. The case 416 in the shape of a rectangular solid shown in FIG. 4 may be replaced with a case or a bag of porous material. This gas absorbing element is especially preferable for large-sized non-aqueous electrolyte secondary batteries used in electric vehicles or the like.

Figure 5:
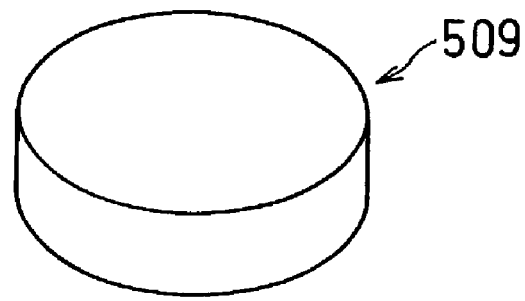
FIG. 5 is a oblique view illustrating one gas absorbing element, which is a molded article of the powdery mixture including the gas absorbent and the lyophobic agent.

FIG. 5 shows a gas absorbing element 509 obtained by molding a powdery mixture of a gas absorbent and a lyophobic agent in a disc shape. This gas absorbing element is suitably located on the end face of the electrode plate assembly in a cylindrical shape.

Figure 6:
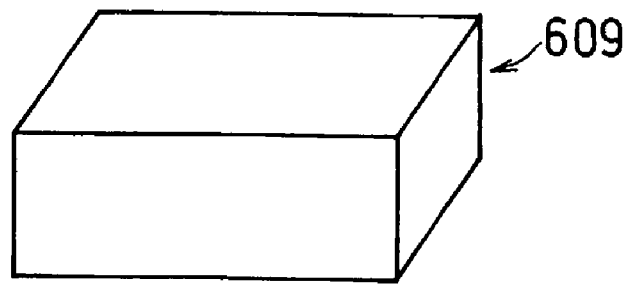
FIG. 6 is a oblique view illustrating another gas absorbing element, which is a molded article of the powdery mixture including the gas absorbent and the lyophobic agent.

FIG. 6 shows a gas absorbing element 609 obtained by molding a powdery mixture of a gas absorbent and a lyophobic agent in a rectangular solid. This gas absorbing element is suitably received, for example, in a thin polymer battery, since the gas absorbing element of this shape is readily inserted together with the electrode plate assembly into the case and is advantageous in manufacture. The case of the thin polymer battery has an inlet, through which the non-aqueous electrolyte is injected. The gas absorbing element 609 may thus be inserted through the inlet, prior to sealing. The inlet is cut and sealed after the injection.

A film-like gas absorbing element may advantageously be formed by spraying and drying an emulsion or a dispersion containing the powdery mixture on the constituent of the battery. One exemplified process is spraying and drying an emulsion or a dispersion containing the powdery mixture to form a film-like gas absorbing element integrated with the inner face of the case. The cylindrical battery has high energy density and produces a large amount of gas. Combination of the bar-like gas absorbing element with the film-like gas absorbing element formed on the inner face of the case is thus especially effective for the cylindrical battery.

Embodiment 2

In this embodiment, the lyophobic agent prevents the gas absorbent from being wetted excessively by the non-aqueous electrolyte.

Figure 7:
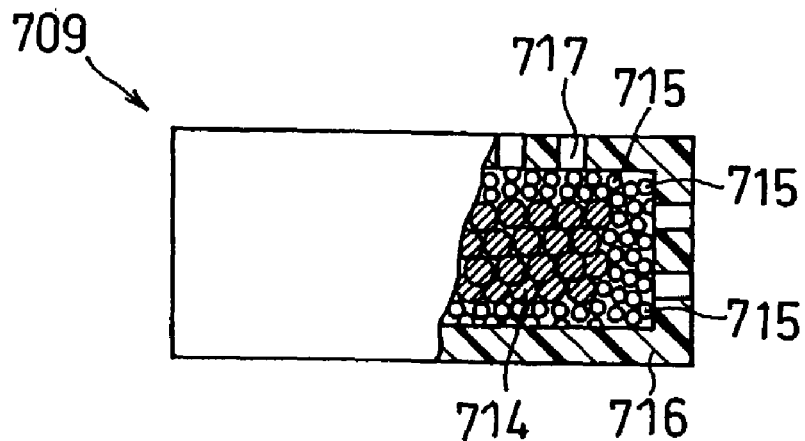
FIG. 7 is a partly omitted, front view illustrating a gas absorbing element including a gas absorbent, and a powdery lyophobic agent that prevents the gas absorbent from being wetted excessively by a non-aqueous electrolyte.

A gas absorbing element 709 shown in FIG. 7 is similar to the gas absorbing element 409 shown in FIG. 4, except that a gas absorbent 714 and a lyophobic agent 715 are not mixed with each other but the powdery lyophobic agent 715 is arranged to surround the powdery gas absorbent 714. The lyophobic property of this gas absorbing element is evaluated by DBP absorption of the lyophobic agent 715.

Figure 8:
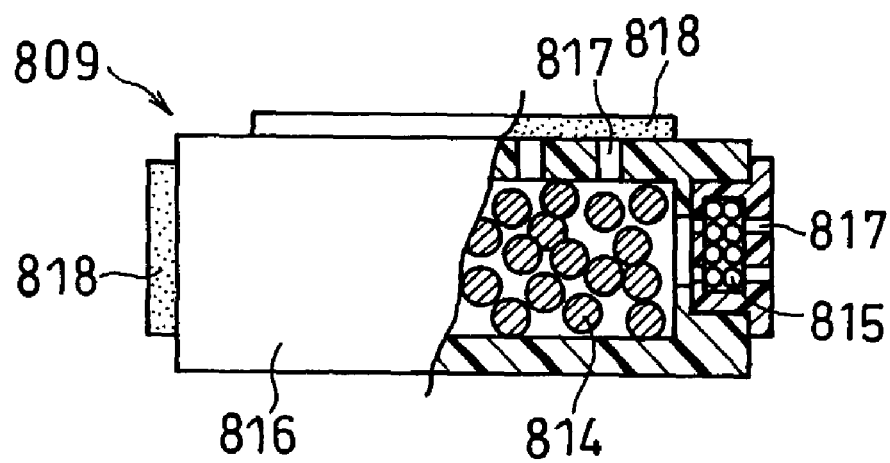
FIG. 8 is a partly omitted, front view illustrating a gas absorbing element including a gas absorbent, a porous layer that prevents the gas absorbent from being wetted excessively by a non-aqueous electrolyte, and a powdery lyophobic agent.

In a gas absorbing element 809 shown in FIG. 8, only a gas absorbent 814 is contained in a container 816, and a gas passage 817 formed in the container 816 is covered with a porous layer 818 comprising the lyophobic agent. The gas absorbing element 809 also has a space that communicates with the gas passage 817 and accommodates a lyophobic agent 815 therein.

Figure 9:
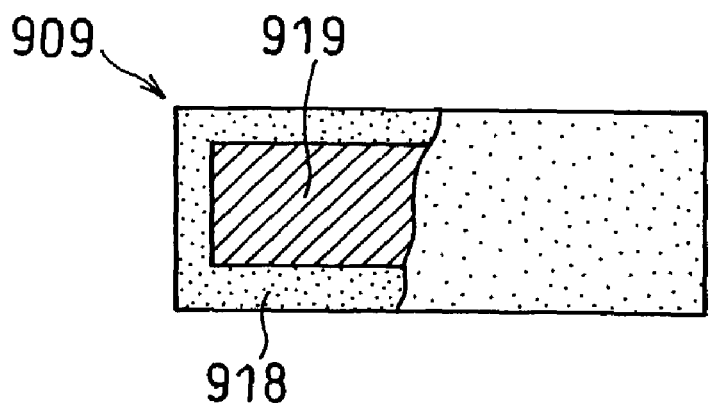
FIG. 9 is a partly omitted, front view illustrating a gas absorbing element including a molded article of a gas absorbent, and a porous layer that prevents the molded article from being wetted excessively by a non-aqueous electrolyte.

In a gas absorbing element 909 shown in FIG. 9, a molded article 919 of the gas absorbent is surrounded by a porous layer 918 comprising the lyophobic agent. When the gas absorbing element has the porous layer comprising the lyophobic agent, the lyophobic property of the gas absorbing element is evaluated by a difference between surface free energy of the porous layer and surface free energy of the non-aqueous electrolyte.

The gas absorbing element composed of the molded article of the gas absorbent and the porous layer as shown in FIG. 9 is produced, for example, according to any of the following processes:

(1) The process of spraying and firing the powdery lyophobic agent onto the molded article of the gas absorbent;

(2) The process of mixing a binding agent with the powdery lyophobic agent, applying the resulting mixture onto the molded article of the gas absorbent, and firing the molded article when necessary; and (3) The process of mixing an aperture-forming material with the lyophobic agent, applying the resulting mixture onto the molded article of the gas absorbent, and removing the aperture-forming material by firing or extraction.

The molded article of the gas absorbent preferably has a plate-like shape or a bar-like shape to be used as the core of the electrode plate assembly as shown in FIGS. 1 through 3.

Embodiment 3

This embodiment regards the accommodated structures of the gas absorbing element different from those of FIGS. 1 through 3. In the following structures, the gas absorbing element is able to be received at a predetermined position simultaneously with insertion of the electrode plate assembly into the case or with attachment of the sealing plate to the case. This advantageously simplifies the battery manufacturing process.

Figure 10:
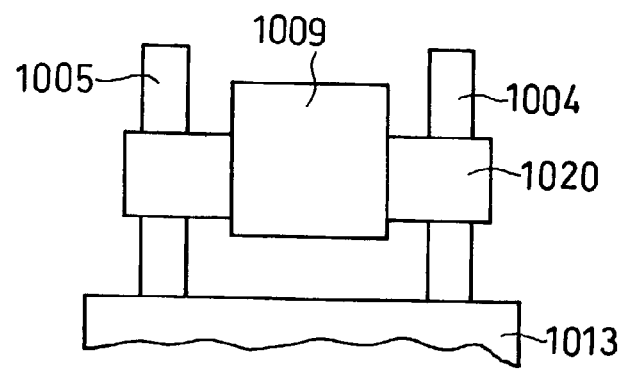
FIG. 10 is a front view illustrating a gas absorbing element fixed to an electrode lead.

FIG. 10 shows one accommodated structure of the gas absorbing element suitable for the battery of FIG. 1 or FIG. 2. In this structure, a gas absorbing element 1009 is fixed on a film 1020 attached to a positive electrode lead 1004 and/or a negative electrode lead 1005 with an adhesive or the like. Fixation of the gas absorbing element 1009 may be attained by the adhesive. It is preferable that the film 1020 is insulative and is electrochemically inactive. This construction enables the gas absorbing element 1009 to be received in the case simultaneously with insertion of an electrode plate assembly 1013 into the case.

Figure 11:
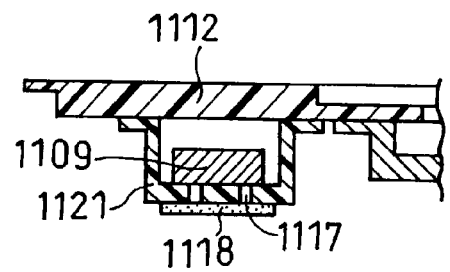
FIG. 11 is a sectional view illustrating a gas absorbing element accommodated in a space of a sealing plate.

FIG. 11 shows a gas absorbing element 1109, which is accommodated in a receiving portion 1121 attached to the inner face of a sealing plate 1112. A gas passage 1117 is formed in the receiving portion 1121 and is covered with a porous layer 1118 comprising the lyophobic agent. This construction enables the gas absorbing element 1109 to be received in the case simultaneously with attachment of the sealing plate 1112 to the case. Alternatively only a gas absorbent may be accommodated in the receiving portion 1121.

Figure 12:
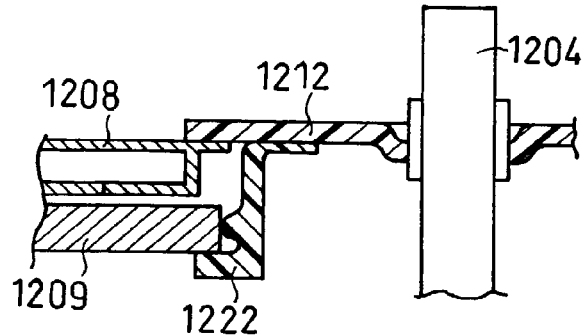
FIG. 12 is a sectional view illustrating a gas absorbing element fixed to a holder of a sealing plate.

FIG. 12 shows a gas absorbing element 1209 that is fixed to a holder 1222 provided on a sealing plate 1212. The holder 1222 may be provided on a lead 1204 of an electrode plate or on the inner wall of a case, instead of the sealing plate 1212.

Figure 13:
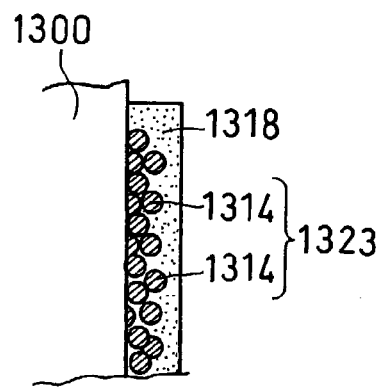
FIG. 13 is a sectional view illustrating a gas absorbing element that is formed at a predetermined site inside a battery and has a coating film including a gas absorbent, and a porous layer covering over the coating film.

In the structure of FIG. 13, a coating film 1323 that is formed at a predetermined site 1300 inside the battery and contains a gas absorbent 1314 is covered with a porous layer 1318 comprising the lyophobic agent. The site 1300 at which the coating film 1323 is formed may be the inner wall of a case, the inner face of a sealing plate, or part of a lead. The coating film 1323 may be formed, for example, by applying a mixture of the gas absorbent and a binding agent onto the predetermined site. The porous layer 1318 may be formed, for example, by applying a mixture of the powdery lyophobic agent and the binding agent onto the coating film 1323. Available examples the binding agent include polyolefin, carboxymethyl cellulose, and polyvinylidene fluoride.

Embodiment 4

This embodiment regards a gas absorbent that selectively absorbs carbon dioxide and methane (hereinafter referred to as the selective gas absorbent). The selective gas absorbent has the lyophobic property to the non-aqueous solvent and accordingly does not require any independent lyophobic agent. The selective gas absorbent does not absorb a large quantity of the air, and still has the capacity of absorbing carbon dioxide and methane even after absorption of the air to its saturated level. The selective gas absorbent is produced, for example, from powdery carbon. The conventional gas absorbent, such as active carbon or carbon black, on the other hand, has various sized pores and diverse functional groups and indiscriminately absorbs a diversity of gases. The gas absorbing capacity of the conventional gas absorbent left in the air is accordingly saturated soon.

The following describes some methods of manufacturing the selective gas absorbent.

(i) Method 1

This method makes benzene chemically adsorbed on a powdery carbon material to manufacture the selective gas absorbent. An apparatus shown in FIG. 15 is suitable for this method.

Figure 15:
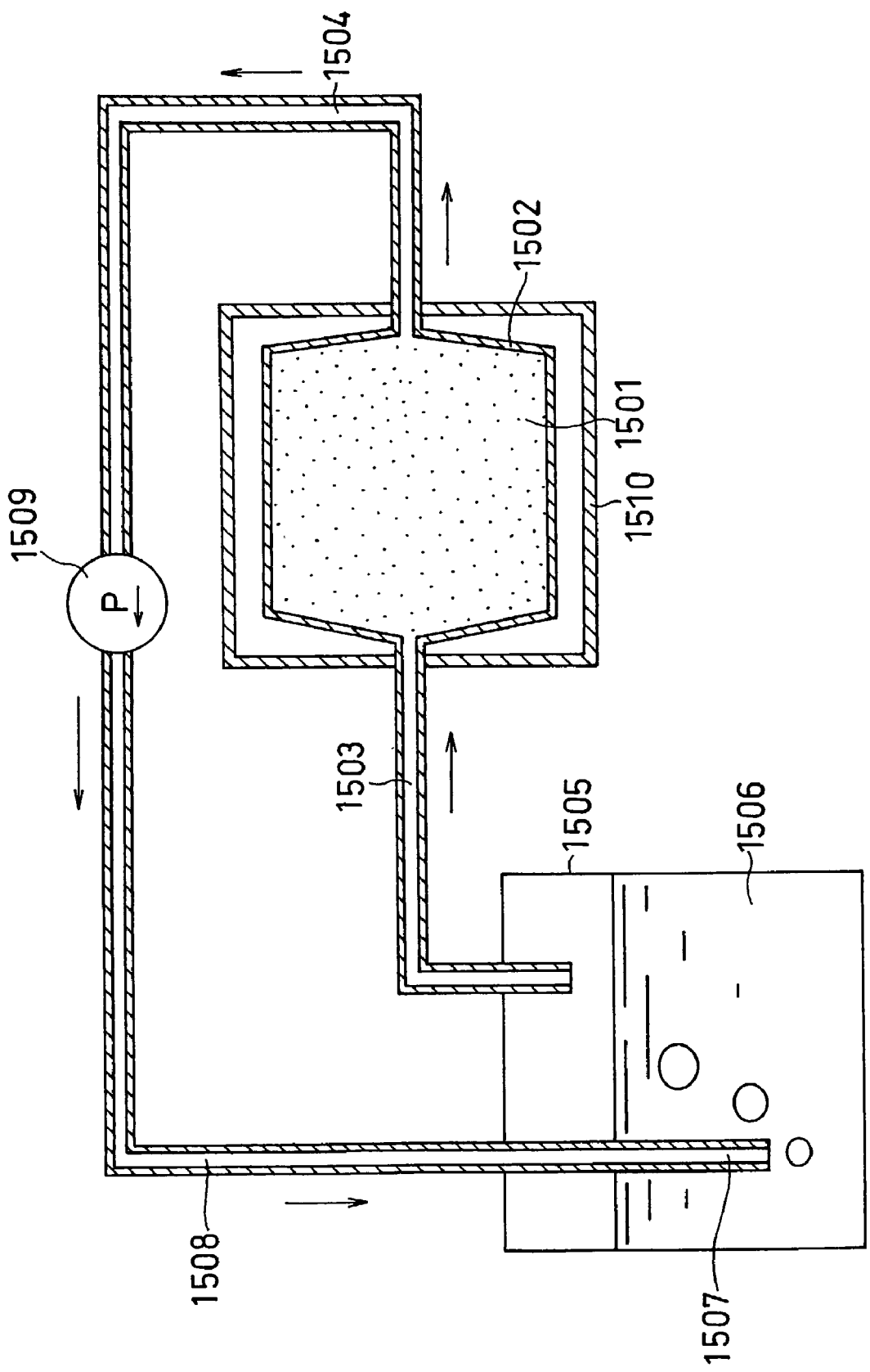
FIG. 15 shows a manufacturing process of a gas absorbent capable of selectively absorbing carbon dioxide.

In the apparatus of FIG. 15, an airtight container 1502 is packed with a powdery carbon material 1501. The container 1502 communicates with a gas supply conduit 1503 and a gas exhaust conduit 1504. A gaseous mixture containing benzene and nitrogen is flown through the gas supply conduit 1503 and is fed into the airtight container 1502. The gaseous mixture containing benzene and nitrogen is produced in a benzene reservoir 1505. A nitrogen gas inlet 1507 is located below the fluid level of benzene 1506 in the benzene reservoir 1505. When nitrogen gas is fed through the nitrogen gas inlet 1507 into the benzene 1506, the gaseous mixture containing benzene and nitrogen is produced. The exhaust gas from the airtight container 1502 is fed to a nitrogen gas supply conduit 1508 by means of a pump 1509 and recycled. The powdery carbon material 1501 is heated in a furnace 1510, together with the gaseous mixture containing benzene and nitrogen fed into the airtight container 1502. When heating starts, the benzene contained in the gaseous mixture is chemically adsorbed on the surface of the powdery carbon material to reform the powdery carbon material.

FIG. 16 shows chemical adsorption of benzene on the surface of the powdery carbon material. A large number of relatively large pores 1602 to allow passage of benzene molecules 1606 are present on the surface of powdery carbon material 1601. Multiple benzene molecules 1606 are chemically adsorbed on the wall surface of the pore 1602 to form a giant planar molecule 1603. Another benzene molecule 1606 is further chemically adsorbed on the planar molecule 1603. The opening of the pore 1602 is gradually narrowed through such iterative chemical adsorption to give a resulting pore 1604 that does not allow passage of the benzene molecule. The final aperture of the pore is desirable for insertion of linear carbon dioxide molecules 1608.

The preferable heating temperature of the powdery carbon material ranges from 600 to 1000° C. The heating at temperature of lower than 600° C. results in poor chemical adsorption of benzene. The heating temperature of higher than 1000° C., on the other hand, causes benzene to excessively cover the surface of the powdery carbon material and does not give the gas absorbent having desired pores. The heating time depends upon the composition of the gaseous mixture containing benzene and nitrogen, but is preferably in a range of 1 to 5 hours.

The pressure of the gaseous mixture containing benzene and nitrogen inside the airtight container 1502 in the course of heating is preferably kept in a range of $1 \times 10^5$ to $2 \times 10^5$ Pa. The preferred content of benzene in the gaseous mixture is 1 to 10% by volume. The desirable temperature range of the benzene 1506 kept in the benzene reservoir 1505 is 30 to 50° C.

Typical examples of the powdery carbon material include active carbon, carbon black, natural graphite, artificial graphite, anthracite coal, and sintered matters of natural fibers, resins, fats, and oils. They may be used alone or in combination. Among them, carbon black and active carbon are especially preferable. The powdery carbon material preferably has a mean particle diameter of 0.05 to 50 μm.

(ii) Method 2

This method heats the powdery carbon material in an inert atmosphere to manufacture the selective gas absorbent. The process comprises heating the powdery carbon material in an inert atmosphere at 600 to 1300° C. for 10 through 120 minutes. A nitrogen or argon atmosphere is preferable for the inert atmosphere. Preferable examples of the powdery carbon material are given in Method 1. Method 2 is suitable for mass production and is industrially preferable.

Heating the powdery carbon material at temperatures of 600 to 1300° C. induces adequate detachment of the functional groups present on the surface of the powdery carbon material and contraction of the powdery carbon. In this process, pores of specific size that allow selective insertion of carbon dioxide and methane are formed on the surface of the powdery carbon.

The heating temperature of lower than 600° C. leaves most of the functional groups present on the surface of the powdery carbon material, so that the resulting gas absorbent does not have sufficient selectivity for carbon dioxide and methane. The heating temperature of higher than 1300° C., on the other hand, causes graphitization and excessive contraction of the powdery carbon, thus significantly decreasing the surface area.

The following describes the preferred properties of the selective gas absorbent.

The selective gas absorbent is less wettable with the non-aqueous solvent than the powdery carbon material. The selective gas absorbent contained in the battery and exposed to the non-aqueous electrolyte still keeps sufficient gas absorption capacity. For example, the DBP absorption of the selective gas absorbent, which has been subjected to absorption of the air to its saturated level in a $1 \times 10^5$ Pa atmosphere of the air at 25° C., is not greater than 150 ml/100 g. The DBP absorption of the powdery carbon material, on the other hand, exceeds 300 ml/100 g.

The selective gas absorbent preferably has a specific surface area of 300 to 1500 $m^2/g$. The ratio of the number of oxygen atoms to the number of carbon atoms, the O/C ratio, in the selective gas absorbent is preferably not greater than 0.1.

It is desirable that the selective gas absorbent has the capacity of absorbing carbon dioxide, methane, or gaseous mixture of carbon dioxide and methane by a volume of at least 10 times that of the air, after 2-hour degasification at 400° C. This property of the gas absorbent is evaluated, for example, with the air, carbon dioxide, methane, and the gaseous mixture of carbon dioxide and methane having a pressure of $10 \times 10^5$ Pa. The selective gas absorbent located in an airtight container including a sample gas, such as carbon dioxide, methane, or the air varies the pressure of the sample gas. The quantity of the sample gas absorbed by the selective gas absorbent is calculated from the pressure variation.

It is desirable that the selective gas absorbent has the capacity of absorbing at least 100 ml/g of carbon dioxide, methane, or gaseous mixture of carbon dioxide and methane in a $1 \times 10^5$ Pa atmosphere of carbon dioxide, methane, or the gaseous mixture of carbon dioxide and methane at 25° C., after absorption of the air to its saturated level in a $1 \times 10^5$ Pa atmosphere of the air at 25° C.

It is also desirable that the weight decreasing rate at 100° C. of the selective gas absorbent, which has been subjected to 2-hour degasification at 400° C. and has absorbed carbon dioxide to its saturate level in a $1.013 \times 10^5$ Pa atmosphere of carbon dioxide at 25° C., in a flow of Ar by differential thermal analysis is not greater than 10% of the weight decreasing rate at 500° C.

Figure 17:
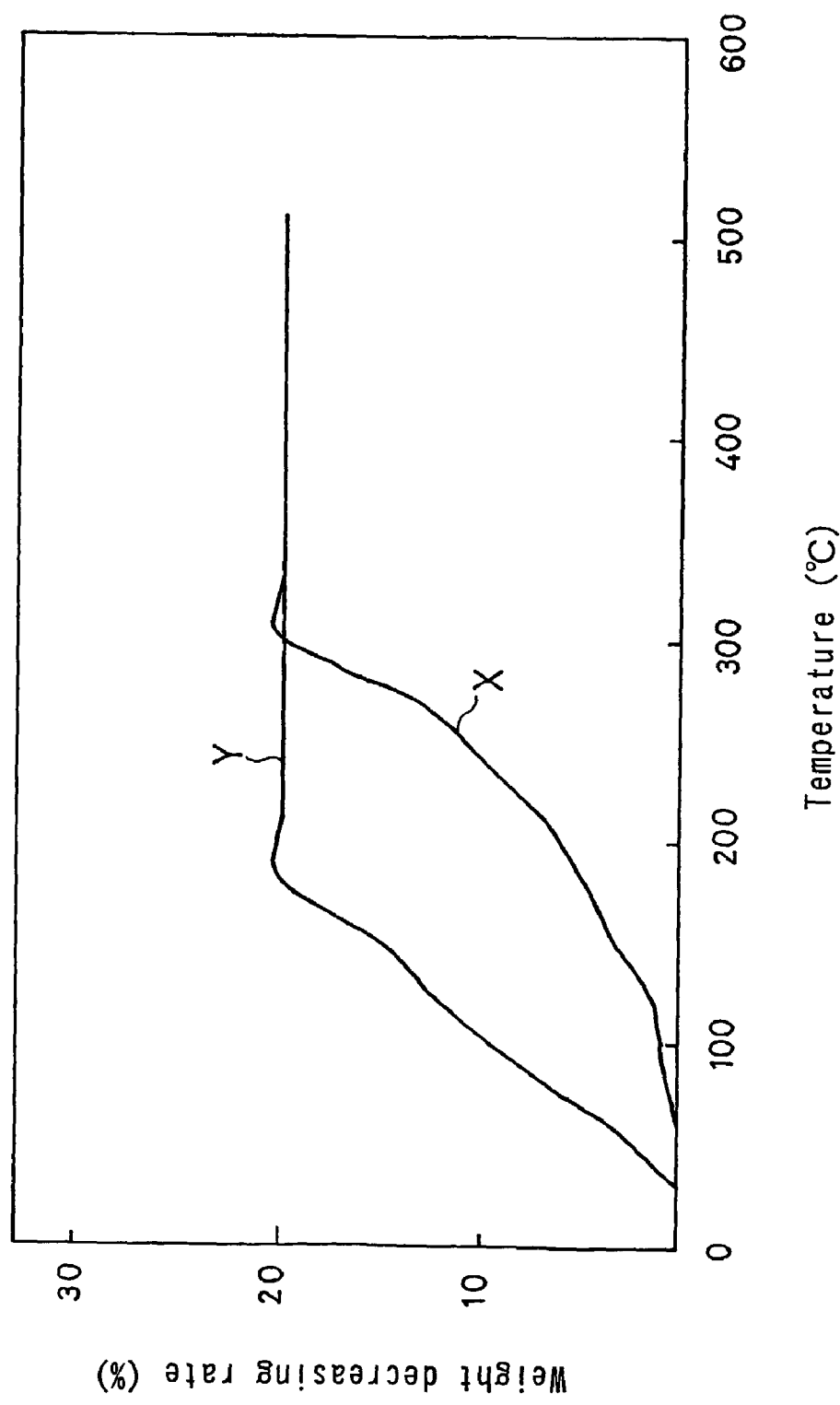
FIG. 17 is a graph showing the weight decreasing rate of a gas absorbent (X) that has absorbed carbon dioxide to its saturated level and a carbon material (Y) plotted against the temperature in differential thermal analysis.

A curve X in the graph of FIG. 17 represents the weight decreasing rate plotted against the temperature when the selective gas absorbent manufactured according to Method 1 has been subjected to 2-hour degasification at 400° C., has absorbed carbon dioxide to its saturated level, and is heated in a flow of Ar. A curve Y represents the weight decreasing rate plotted against the temperature when the powdery carbon material is heated in a flow of Ar.

While the weight decreasing rate of the selective gas absorbent at 200° C. is less than 10%, the weight decreasing rate of the powdery carbon material exceeds 20%. There is no such a difference when the air is used instead of carbon dioxide. This proves that carbon dioxide is strongly adsorbed on the selective gas absorbent, compared with the powdery carbon material. The weight decreasing rate at 100° C. of the selective gas absorbent, which has absorbed carbon dioxide to its saturated level, in a flow of Ar by differential thermal analysis is approximately 4% of the weight decreasing rate at 500° C. This also proves strong adsorption of carbon dioxide on the selective gas absorbent.

The selective gas absorbent may be molded or sintered and located at any arbitrary position in the battery. The selective gas absorbent may be mixed with a thickening agent and applied in any arbitrary site inside the battery. As discussed above in Embodiments 1 through 3, the selective gas absorbent may also be combined with the lyophobic agent. The selective gas absorbent may be included in at least either one of a positive electrode material mixture and a negative electrode material mixture.

The positive electrode material mixture includes, for example, a positive electrode active material, a conducting material, and a binding agent. These materials are kneaded with the selective gas absorbent and a disperse medium to yield paste or slurry positive electrode material mixture containing the selective gas absorbent. In the case where the selective gas absorbent is electrically conductive, the selective gas absorbent may be used instead of the conducting material. This positive electrode material mixture is applied on a current collector, dried, rolled, and cut to a predetermined shape. This process gives a positive electrode.

The negative electrode material mixture includes, for example, a negative electrode material and a binding agent. These materials are kneaded with the selective gas absorbent and a disperse medium to yield paste or slurry negative electrode material mixture containing the selective gas absorbent. This negative electrode material mixture is applied on a current collector, dried, rolled, and cut to a predetermined shape. This process gives a negative electrode.

Any of metal foils, metal films, metal sheets, meshes, lath plates, punched metals may be applicable for the current collector. In one preferable example, the positive electrode collector is composed of aluminum, while the negative electrode collector is composed of copper.

Li-containing transition metal oxides are applicable for the positive electrode active material. Typical examples of the Li-containing transition metal oxide include $LiCoO_2$, $LiMnO_2$, $Li_2MnO_4$, $LiMn_2O_4$ and $LiNiO_2$. These may be used alone or in combination.

Metal lithium, artificial graphite, natural graphite, and amorphous carbon are applicable for the negative electrode material. These may be used alone or in combination.

Carbon materials, such as graphite powder, active carbon, carbon black, and carbon fibers are applicable for the conducting material. These may be used alone or in combination.

Fluorocarbon resins are applicable for the binding agent. Typical examples of the fluorocarbon resin include polyvinylidene fluoride, polyhexafluoropropylene, polytetrafluoroethylene, and vinylidene fluoride-hexafluoropropylene copolymer. These may be used alone or in combination.

Water and organic solvents are applicable for the disperse medium. N-methyl-2-pyrrolidone is a desirable disperse medium, since it facilitates kneading of the electrode material mixture and accelerates drying of the electrode material mixture.

A reinforcing agent, such as polymer fillers, and a viscosity control agent other than the above materials may be included in the electrode material mixture.

The non-aqueous electrolyte preferably includes a lithium salt and a non-aqueous solvent that dissolves the lithium salt. Typical examples of the lithium salt include $LiBF_4$ and $LiPF_6$. These may be used alone or in combination. Typical examples of the non-aqueous solvent include ethylene carbonate, propylene carbonate, ethyl methyl carbonate, dimethyl carbonate, and diethyl carbonate. These may be used alone or in combination.

Generation of a decomposed gas at a rate of 15 ml or a greater volume per 1000 mAh of the battery capacity inside the non-aqueous electrolyte secondary battery damages the safety of the battery. For absorption of 15 ml or the greater volume of the decomposed gas, at least 0.2 g of the gas absorbent is required.

The present invention is discussed more concretely with examples.

EXAMPLE 1

A thin polymer battery as shown in FIG. 1 was manufactured.

(i) Production of Gas Absorbing Element

Active carbon obtained by activating carbon black (acetylene black) with KOH was used as a gas absorbent. The DBP absorption of the gas absorbent (carbon black-type active carbon) was 250 ml/100 g. Polytetrafluoroethylene (hereinafter referred to as PTFE) having a mean particle diameter of 1 μm was applied for the lyophobic agent. The DBP absorption of the PTFE powder was 20 ml/100 g.

100 parts by weight of the gas absorbent was mixed with 25 parts by weight of the lyophobic agent by means of a gas jet blender to yield a powdery mixture. The DBP absorption of the resulting powdery mixture was 30 ml/100

The powdery mixture was molded under a pressure of 150 kgf/cm$^2$ to a rectangular solid of 5 mm in length, 15 mm in width, and 2 mm in thickness, and the molded article was sintered in a flow of nitrogen at 300° C. for 30 minutes. This gave a gas absorbing element of a rectangular solid. The surface free energy of the rectangular solid gas absorbing element was 15 mN/m at 20° C.

The non-aqueous electrolyte used in this Example 1 and subsequent Examples 2 through 8 and Comparative Examples 1 through 4 was prepared by dissolving $LiPF_6$ in a 1:1 (volume ratio) solvent mixture of ethylene carbonate and diethyl carbonate at a concentration of 1 mol/liter. The surface free energy of the non-aqueous electrolyte was 40 mN/m at 20° C.

(ii) Production of Thin Polymer Battery (a) Preparation of Positive Electrode 100 parts by weight of $LiCoO_2$ as the positive electrode active material, 5 parts by weight of carbon black as the conducting material, 8 parts by weight of a copolymer including 90% by weight of vinylidene fluoride unit and 10% by weight of hexafluoropropylene unit (hereinafter referred to as PVDF-HFP), and an adequate quantity of N-methyl-2-pyrrolidone were kneaded to yield a positive electrode material mixture. PVDF-HFP was dissolved in N-methyl-2-pyrrolidone. The positive electrode material mixture was then applied on one face of an aluminum foil current collector having a thickness of 20 μm, rolled, dried, and cut to a predetermined size. This gave a positive electrode plate having a thickness of 125 μm. A positive electrode lead was connected to the positive electrode plate.

(b) Preparation of Negative Electrode 100 parts by weight of artificial graphite as the negative electrode material, 14 parts by weight of PVDF-HFP, and an adequate quantity of N-methyl-2-pyrrolidone were kneaded to yield a negative electrode material mixture. PVDF-HFP was dissolved in N-methyl-2-pyrrolidone. The negative electrode material mixture was then applied on both faces of a copper foil current collector having a thickness of 10 μm, rolled, dried, and cut to a predetermined size. This gave a negative electrode plate having a thickness of 265 μm. A negative electrode lead was connected to the negative electrode plate.

(c) Assembly of Battery

One positive electrode plate was interposed between two negative electrode plates via separator layers to assemble a stack of electrode plates. A mixture of PVDF-HFP and N-methyl-2-pyrrolidone was used for the separator layers. The stack of electrode plates was inserted into a bag-shaped case of a laminate sheet including a resin film and an aluminum foil.

The opening of the case was subsequently sealed, except an inlet for the electolyte, via the two leads and a film (safety valve) comprising a copolymer of ethylene and acrylic acid. The safety valve was set to open when the internal pressure of the battery was higher than the atmospheric pressure by 1.5 kgf/cm$^2$. The rectangular solid gas absorbing element was inserted through the inlet, and the non-aqueous electrolyte was then injected through the inlet. The inlet was finally sealed to complete a thin polymer battery (La) as shown in FIG. 1. The resulting thin polymer battery (La) had the thickness of 3.6 mm, the width of 63 mm, the length of 70 mm, and the capacity of 1150 mAh.

EXAMPLE 2

A rectangular battery as shown in FIG. 2 was manufactured.

(i) Production of Gas Absorbing Element

The same powdery mixture prepared in Example 1 was molded under a pressure of 150 kgf/cm$^2$ to a plate-like shape of 15 mm in length, 47 mm in width, and 0.3 mm in thickness, and the molded article was sintered in a flow of nitrogen at 300° C. for 30 minutes. This gave a plate-like gas absorbing element. The surface free energy of the plate-like gas absorbing element was 17 mN/m at 20° C.

(ii) Production of Rectangular Battery (a) Preparation of Positive Electrode 100 parts by weight of $LiCoO_2$ as the positive electrode active material, 3 parts by weight of carbon black as the conducting material, 4 parts by weight of polyvinylidene fluoride, and an adequate quantity of N-methyl-2-pyrrolidone were kneaded to yield a positive electrode material mixture. Polyvinylidene fluoride was dissolved in N-methyl-2-pyrrolidone. The positive electrode material mixture was then applied on an aluminum foil current collector having a thickness of 20 μm, rolled, dried, and cut to a predetermined size. This gave a positive electrode plate having a thickness of 140 μm. A positive electrode lead was connected to the positive electrode plate.

(b) Preparation of Negative Electrode 100 parts by weight of artificial graphite as the negative electrode material, 8 parts by weight of polyvinylidene fluoride, and an adequate quantity of N-methyl-2-pyrrolidone were kneaded to yield a negative electrode material mixture. Polyvinylidene fluoride was dissolved in N-methyl-2-pyrrolidone. The negative electrode material mixture was then applied on a copper foil current collector having a thickness of 10 μm, rolled, dried, and cut to a predetermined size. This gave a negative electrode plate having a thickness of 150 μm. A negative electrode lead was connected to the negative electrode plate.

(c) Assembly of Battery

The positive electrode plate and the negative electrode plate were laid one upon the other via a polypropylene porous separator, and wound to a flat-sided shape around the plate-like gas absorbing element as the core to assemble an electrode plate assembly. Application of the plate-like gas absorbing element for the core facilitated the winding process of the electrode plate assemly and did not require removal of the core from the electrode plate assembly. Namely this construction significantly simplifies the manufacturing process, compared with the conventional rectangular batteries.

The electrode plate assembly was inserted into a thin rectangular case, and the non-aqueous electrolyte was then injected into the case. Application of the gas absorbing element for the core effectively prevented deformation of the electrode plate assembly during its insertion, and remarkably reduced the percent of defective. The opening of the case was sealed with a sealing plate having the ends of the two leads and a safety valve. This completed a rectangular battery (Ma) as shown in FIG. 2. The safety valve was set to open when the internal pressure of the battery was higher than the atmospheric pressure by 3 kgf/cm$^2$. The resulting rectangular battery (Ma) had the thickness of 6.3 mm, the width of 34 mm, the length of 50 mm, and the capacity of 850 mAh.

EXAMPLE 3

A cylindrical battery as shown in FIG. 3 was manufactured.

(i) Production of Gas Absorbing Element

The same powdery mixture prepared in Example 1 was molded under a pressure of 150 kgf/cm$^2$ to a semicircle-ended bar-like shape of 57 mm in length and 1.2 mm in diameter of the semicircle, and the molded article was sintered in a flow of nitrogen at 300° C. for 30 minutes. This gave a bar-like gas absorbing element. The surface free energy of the bar-like gas absorbing element was 17 mN/m at 20° C.

An aqueous emulsion was prepared including 100 parts by weight of the gas absorbent (carbon black-type active carbon) prepared in Example 1 and 5 parts by weight of PTFE powder having a mean particle diameter of 1 μm. The resulting emulsion was sprayed onto the inner face of a cylindrical case and dried to form an additional gas absorbing element of a coating film having a thickness of 0.5 mm. The surface free energy of the coating film was 20 mN/m at 20° C.

(ii) Production of Cylindrical Battery

A positive electrode plate and a negative electrode plate were prepared in the same manner as Example 2. The positive electrode plate and the negative electrode plate were laid one upon the other via a polypropylene porous separator, with the ends of the laminate clamped between the flat parts of two bar-like gas absorbing elements, and the laminate was wound around the two gas absorbing elements as the core in a spiral form. This gave a cylindrical electrode plate assembly.

The electrode plate assembly was inserted into the cylindrical case provided with the additional gas absorbing element of the coating film, and the non-aqueous electrolyte was then injected into the case. The opening of the case was sealed with a sealing plate having a safety valve and functioning as a positive electrode outer terminal. This completed a cylindrical battery (Na) as shown in FIG. 3. The safety valve was set to open when the internal pressure of the battery was higher than 12 kgf/cm$^2$. The resulting cylindrical battery (Na) had the diameter of 18.3 mm, the height of 65 mm, and the capacity of 1800 mAh.

As in the case of the rectangular battery, application of the gas absorbing element for the core in the cylindrical battery simplified the manufacturing process and effectively prevented deformation of the electrode plate assembly.

COMPARATIVE EXAMPLE 1

100 parts by weight of the gas absorbent (carbon black-type active carbon) prepared in Example 1 was mixed with 5 parts by weight of saccharose and an adequate quantity of water. The mixture was molded under a pressure of 150 kgf/cm$^2$ to a rectangular solid of 5 mm in length, 15 mm in width, and 2 mm in thickness, and the molded article was sintered in a flow of nitrogen at 300° C. for 30 minutes. This gave a gas absorbing element of a rectangular solid without the lyophobic agent. The surface free energy of the rectangular solid gas absorbing element without the lyophobic agent was 37 mN/m at 20° C. A thin polymer battery (Lr) was then manufactured in the same manner as Example 1, except that the rectangular solid gas absorbing element without the lyophobic agent was used.

COMPARATIVE EXAMPLE 2

100 parts by weight of the gas absorbent (carbon black-type active carbon) prepared in Example 1 was mixed with 5 parts by weight of saccharose and an adequate quantity of water. The mixture was molded under a pressure of 150 kgf/cm$^2$ to a plate-like shape of 15 mm in length, 47 mm in width, and 0.3 mm in thickness, and the molded article was sintered in a flow of nitrogen at 300° C. for 30 minutes. This gave a plate-like gas absorbing element without the lyophobic agent. The surface free energy of the plate-like gas absorbing element without the lyophobic agent was 38 mN/m at 20° C. A rectangular battery (Mr) was then manufactured in the same manner as Example 2, except that the plate-like gas absorbing element without the lyophobic agent was used.

COMPARATIVE EXAMPLE 3

100 parts by weight of the gas absorbent (carbon black-type active carbon) prepared in Example 1 was mixed with 5 parts by weight of saccharose and an adequate quantity of water. The mixture was molded under a pressure of 150 kgf/cm$^2$ to a semicircle-ended bar-like shape of 1.2 mm in diameter of the semicircle and 57 mm in length, and the molded article was sintered in a flow of nitrogen at 300° C. for 30 minutes. This gave a bar-like gas absorbing element without the lyophobic agent. The surface free energy of the bar-like gas absorbing element without the lyophobic agent was 38 mN/m at 20° C.

A coating film of 0.5 mm in thickness was formed on the inner face of a cylindrical case in the same manner as Example 3, except that the aqueous emulsion did not contain PTFE powder but contained the carbon black-type active carbon prepared in Example 1. The surface free energy of the coating film was 36 mN/m at 20° C. A cylindrical battery (Nr) was manufactured in the same manner as Example 3, except that the bar-like gas absorbing element without the lyophobic agent and the cylindrical case with the coating film not including the lyophobic agent were used.

Evaluation of Batteries 1

The batteries of Examples 1 through 3 and Comparative Examples 1 through 3 were evaluated as discussed below. Prior to the test, each battery was initially charged to 4.20 V with an electric current of 0.1 C (10-hour rate).

Each battery was then subjected to a charge-discharge cycle test at 45° C. The test repeated a cycle, which discharged each battery to 3.0 V with an electric current of 1C, charged the battery to 4.25 V with an electric current of 0.7 C, and further charged the battery at a fixed voltage to attain an electric current level of 0.05 C. A cycle life was measured as the number of cycles until the capacity became less than 60% of the initial capacity in the first cycle or until the safety valve worked. The less sufficient absorption of the gas generated in the battery by the gas absorbing element results in the smaller number of cycles. The results of the evaluation test are shown in Table 1.

TABLE 1

| Examples | Batteries | Type of Battery | Cycle Life (times) |
|---|---|---|---|
| Ex. 1 | La | Thin polymer battery | 330 |
| Ex. 2 | Ma | Rectangular battery | 380 |
| Ex. 3 | Na | Cylindrical battery | 375 |
| Com. Ex. 1 | Lr | Thin polymer battery | 50 |
| Com. Ex. 2 | Mr | Rectangular battery | 60 |
| Com. Ex. 3 | Nr | Cylindrical battery | 70 |

As shown in Table 1, any of the batteries Lr, Mr, and Nr in Comparative Examples, where the gas absorbing element did not include the lyophobic agent, had the life of shorter than 100 cycles. Any of the batteries La, Ma, and Na in Examples, on the other hand, had the life of longer than 300 cycles.

After the test, each battery was decomposed for the purpose of observation of the gas absorbing element. In the batteries of Comparative Examples that did not reach 100 cycles, the gas absorbing element was significantly wetted with the non-aqueous electrolyte. In the batteries of Examples that exceeded 300 cycles, on the other hand, the gas absorbing element still possessed the ability of repelling the non-aqueous electrolyte. This proves efficient gas absorption.

As clearly understood, the lyophobic agent enables the gas absorbent to efficiently absorb the gas and thereby stabilizes the battery characteristics.

EXAMPLE 4

Powdery mixtures having different DBP absorptions were produced in the same manner as Example 1, except that the mixing ratio of the PTFE powder to the gas absorbent (carbon black-type active carbon) was varied in a range of 2 to 30 parts by weight relative to 100 parts by weight of the gas absorbent. The DBP absorption of the powdery mixture containing 2 parts by weight of the PTFE powder relative to 100 parts by weight of the gas absorbent was 180 ml/100 g. The DBP absorption of the powdery mixture containing 30 parts by weight of the PTFE powder relative to 100 parts by weight of the gas absorbent was 30 ml/100 g. The DBP absorption of the other powdery mixtures was in the range of 30 to 180 ml/100 g.

Each of the powdery mixtures was molded under a pressure of 150 kgf/cm$^2$ to a plate-like shape of 15 mm in length, 47 mm in width, and 0.3 mm in thickness, and was sintered in a flow of nitrogen at 300° C. for 30 minutes. This gave a plate-like gas absorbing element like Example 2. Rectangular batteries (Mb$_n$) were then manufactured in the same manner as Example 2, except that the respective gas absorbing elements were used.

Evaluation of Batteries 2

The batteries Mb$_n$ of Example 4 were subjected to the charge-discharge cycle test according to the procedure discussed in Evaluation of Batteries 1. The graph of FIG. 14 shows the cycle life of the battery plotted against the DBP absorption of the powdery mixture. As shown in FIG. 14, the batteries having the excellent cycle life are obtained when the DBP absorption of the powdery mixture is not greater than 150 ml/100 g. The results show that the reliability of the battery is significantly affected by the lyophobic property of the powdery mixture included in the gas absorbing element. Namely adjustment of the DBP absorption of the powdery mixture to be not greater than 150 ml/100 g keeps the gas absorbent from being wetted with the non-aqueous solvent, thus ensuring long-term, stable gas absorption capacity.

EXAMPLE 5

The powdery mixture prepared in Example 1 was molded under varying pressures of 50 to 300 kgf/cm$^2$ to a plate-like shape of 15 mm in length, 47 mm in width, and 0.3 mm in thickness, and was sintered in a flow of nitrogen at 300° C. for 30 minutes. This gave multiple plate-like gas absorbing elements. The surface free energy of the gas absorbing elements was in a range of 30 to 13 mN/m at 20° C. The variation in surface free energy is ascribed to the changed surface conditions of the gas absorbing element due to the varying molding pressure. Rectangular batteries (Mc$_n$) were then manufactured in the same manner as Example 2, except that the respective gas absorbing elements were used.

Evaluation of Batteries 3

The batteries Mc$_n$ of Example 5 were subjected to the charge-discharge cycle test according to the procedure discussed in Evaluation of Batteries 1. Table 2 shows the mapping of the difference between the surface free energy of the gas absorbing element and the surface free energy of the non-aqueous electrolyte to the cycle life of the battery.

TABLE 2

| Example | Batteries | Surface Free Energy Difference (mN/m) | Cycle Life (times) |
|---|---|---|---|
| Ex. 5 | Mc$_1$ | 10 | 216 |
|  | Mc$_2$ | 15 | 300 |
|  | Mc$_3$ | 20 | 360 |
|  | Mc$_4$ | 23 | 380 |
|  | Mc$_5$ | 27 | 395 |

As clearly seen in Table 2, the greater difference in surface free energy gave the battery of the longer life. According to the results, regulating the difference between the surface free energy of the gas absorbing element and the surface free energy of the non-aqueous electrolyte (40 mN/m) keeps the gas absorbent from being wetted with the non-aqueous solvent, thus ensuring long-term, stable capacity of absorbing the produced gas.

EXAMPLE 6

Gas absorbing elements were produced and rectangular batteries (Md$_n$) were manufactured in the same manner as Example 2, except that the PTFE powder as the lyophobic agent was replaced with polyethylene powder, polypropylene powder, polyvinylidene fluoride powder, polyacrylonitrile powder, or SBR powder. Any of these lyophobic agents had the mean particle diameter of 1.0 μm.

Evaluation of Batteries 4

The batteries Md$_n$ of Example 6 were subjected to the charge-discharge cycle test according to the procedure discussed in Evaluation of Batteries 1. Table 3 shows the mapping of the various lyophobic agents to the difference between the surface free energy of the gas absorbing element and the surface free energy of the non-aqueous electrolyte and the life of the battery.

TABLE 3

| Example | Batteries | Lyophobic Agent | Surface Free Energy Difference (mN/m) | Cycle Life (times) |
|---|---|---|---|---|
| Ex. 6 | $Md_0$ | PTFE | 25 | 380 |
| | $Md_1$ | Polyethylene | 10 | 180 |
| | $Md_2$ | Polypropylene | 13 | 210 |
| | $Md_3$ | Polyvinylidene fluoride | 3 | 72 |
| | $Md_4$ | Polyacrylonitrile | 6 | 168 |
| | $Md_5$ | SBR | 18 | 300 |

As clearly seen in Table 3, when the difference in surface free energy is not less than 5 mN/m, the resulting battery has the sufficiently long life, regardless of the variation in lyophobic agent.

EXAMPLE 7

Gas absorbing elements were produced and rectangular batteries ($Me_n$) were manufactured in the same manner as Example 2, except that carbon black-type active carbon as the gas absorbent was replaced with carbon black, zeolite, pitch-type active carbon, or palm shell active carbon.

Evaluation of Batteries 5

The batteries Men of Example 7 were subjected to the charge-discharge cycle test according to the procedure discussed in Evaluation of Batteries 1. The battery using the pitch-type active carbon had the longest life, and the life of the battery was shortened in the order of carbon black-type active carbon, palm shell active carbon, zeolite, and carbon black. The results show that the pitch-type active carbon, carbon black-type active carbon, and palm shell active carbon are especially preferable for the gas absorbent.

EXAMPLE 8

(i) Production of Gas Absorbing Element 100 parts by weight of the gas absorbent (carbon black-type active carbon) prepared in Example 1 was mixed with 5 parts by weight of saccharose and an adequate quantity of water. The mixture was molded under a pressure of 150 kgf/cm$^2$ to a plate-like shape of 15 mm in length, 47 mm in width, and 0.3 mm in thickness, and the molded article was sintered in a flow of nitrogen at 300° C. for 30 minutes.

The PTFE powder used in Example 1 was then homogeneously sprayed over the whole face of the sintered article, and the article was further heated at 300° C. for 30 minutes to sinter the PTFE powder and form a porous layer of 20 μm in thickness. The surface free energy of the sintered article covered with the porous layer was 18 mN/m at 20° C.

(ii) Production of Rectangular Battery

A rectangular battery was manufactured in the same manner as Example 2, except that the plate-like sintered body covered with the porous layer was used as the gas absorbing element. This battery is expressed as Mf.

COMPARATIVE EXAMPLE 4

A battery similar to Example 8 was manufactured, except that the sintered article of carbon black-type active carbon without the porous layer was used. This battery is expressed as $Mr_2$.

Evaluation of Batteries 6

The batteries Mf and $Mr_2$ were subjected to the charge-discharge cycle test according to the procedure discussed in Evaluation of Batteries 1. The results are shown in Table 4.

TABLE 4

| Example | Batteries | Gas Absorbing Element | Surface Free Energy Difference (mN/m) | Cycle Life (times) |
|---|---|---|---|---|
| Ex. 8 | Mf | Molded article covered with porous layer | 22 | 375 |
| Com.Ex. 4 | $Mr_2$ | Molded article Alone | 3 | 55 |

As clearly seen in Table 4, the life of the battery Mf with the lyophobic agent-provided gas absorbing element is significantly longer than the life of the battery $Mr_2$ with the gas absorbent alone.

EXAMPLE 9

The following describes application of the gas absorbing element including the selective gas absorbent.

(i) Preparation of Selective Gas Absorbents (a) Selective Gas Absorbent a

Palm shell active carbon obtained by firing the palm shell at temperatures of 400 to 650° C. was used as the powdery carbon material. The powdery carbon material was soaked in a 10N aqueous KOH solution, was dehydrated, and was exposed to steam having temperature of not lower than 110° C. for 24 hours for activation. The obtained carbon material after the above activation process (specific surface area: 120 m$^2$/g; DBP absorption: 110 ml/100 g) is expressed as r.

The carbon material r was then located in a flow of Ar and the temperature was increased at a rate of 10° C./minute up to 600° C. to heat the carbon material r at the temperature for 1 hour. This gave a selective gas absorbent a having the capacity of selectively absorbing methane and carbon dioxide.

(b) Selective Gas Absorbent b

Commercially available carbon black was used as the powdery carbon material. This powdery carbon material was subjected to the same activation process as the carbon material r. The obtained carbon material is expressed as s.

The carbon material s was then located in a flow of Ar and the temperature was increased at a rate of 10° C./minute up to 600° C. to heat the carbon material s at the temperature for 1 hour. This gave a selective gas absorbent b having the capacity of selectively absorbing methane and carbon dioxide.

(c) Selective Gas Absorbent c

The carbon material r was heated in a 1.5×10$^5$ Pa gaseous mixture atmosphere containing benzene and nitrogen at 600° C. for 2 hours. This gave a selective gas absorbent c having the capacity of selectively absorbing carbon dioxide. The content of benzene in the gaseous mixture was 5% by volume.

(ii) Evaluation of Selective Gas Absorbents and Carbon Material s (a) Selectivity of Gas Absorption In the procedure of the test, a fixed quantity of each of the selective gas absorbents and the carbon material s was heated in a vacuum atmosphere at 400° C. for 2 hours, while degasifying the atmosphere to a pressure of 1 Torr ($1.3 \times 10^2$ Pa). Then, air at 25° C. was introduced into the atmosphere to a pressure of 1 atm ($1 \times 10^5$ Pa). The sample was then left for one hour to confirm no variation in pressure of the atmosphere. A volume V1 of the air absorbed by each of the selective gas absorbent and the carbon material s was measured.

The procedure of the test then used the equi-volume gaseous mixture of methane and carbon dioxide, in place of the air at 25° C., and measured a volume V2 of the gaseous mixture absorbed by each of the selective gas absorbents and the carbon material s. The ratio V2/V1 was then calculated. The results are shown in Table 5.

The air volume V1 and the gaseous mixture volume V2 absorbed by 1 g of the selective gas absorbent a were respectively 0.12 ml and 8 ml.

(b) DBP Absorption

In the procedure of the test, each of the selective gas absorbents and the carbon material s was heated in the vacuum atmosphere at 400° C. for 2 hours, while degasifying the atmosphere to the pressure of 1 Torr. Then, each of the selective gas absorbents and the carbon material s subjected to absorption of the air to the respective saturated levels in a $1 \times 10^5$ Pa atmosphere of the air at 25° C. 100 g of each of the selective gas absorbents and the carbon material s was then soaked in DBP to make them sufficiently absorb DBP. After excess DBP was removed, the volume of DBP absorbed by each of the selective gas absorbents and the carbon material s was measured. The results are shown in Table 5.

(c) Weight Decreasing Rate

In the procedure of the test, each of the selective gas absorbents and the carbon material s was heated in the vacuum atmosphere at 400° C. for 2 hours, while degasifying the atmosphere to the pressure of 1 Torr. Then, each of the selective gas absorbents and the carbon material s was subjected to absorption of carbon dioxide to the respective saturated levels in a $1 \times 10^5$ Pa atmosphere of carbon dioxide. The weight decreasing rates at 100° C. and at 500° C. of each of the selective gas absorbents and the carbon material s was measured in a flow of Ar by differential thermal analysis, and the ratio of the weight decreasing rate at 100° C. to the weight decreasing rate at 500° C. was calculated. The results expressed as percent are shown in Table 5.

(d) O/C Ratio

The O/C ratio of each of the selective gas absorbents and the carbon material s was measured by organic elemental analysis. The results are shown in Table 5.

(e) Specific Surface Area

The specific surface area of each of the selective gas absorbents and the carbon material s was measured by the BET method. All of the selective gas absorbents and the carbon material s had the specific surface area of greater than 500 $m^2/g$.

TABLE 5

| Selective Gas Absorbents | V2/V1 | DBP Absorption (ml/100 g) | Ratio of Weight Decreasing Rate (%) | O/C Ratio |
|---|---|---|---|---|
| a | 65 | 96 | 5 | 0.12 |
| b | 175 | 115 | 2 | 0.08 |
| c | 200 | 62 | 1 | 0.12 |
| Carbon Material s | 0.2 | 459 | 50 | 0.2 |

(iii) Production of Batteries (a) Battery 1a

LiCoO$_2$ was used as the positive electrode active material. 100 parts by weight of LiCoO$_2$, 3 parts by weight of a conducting material, 10 parts by weight of polyvinylidene fluoride, and 70 parts by weight of N-methyl-2-pyrrolidone were kneaded to yield a positive electrode material mixture. Polyvinylidene fluoride was dissolved in N-methyl-2-pyrrolidone. The positive electrode material mixture was then applied on both faces of an aluminum foil current collector having a thickness of 20 μm, rolled, dried, and cut to a predetermined size. This gave a positive electrode plate having a thickness of 150 μm and a weight per unit area of 3.2 g/cm$^2$.

A 2:1 (weight ratio) mixture of the carbon material s and the selective gas absorbent a was used for the conducting material. The content of the selective gas absorbent a in a resulting battery 1a was 0.2 g.

Artificial graphite was used as the negative electrode active material. 100 parts by weight of artificial graphite, 3 parts by weight of carbon black as the conducting material, 8 parts by weight of polyvinylidene fluoride, and 70 parts by weight of N-methyl-2-pyrrolidone were kneaded to yield a negative electrode material mixture. Polyvinylidene fluoride was dissolved in N-methyl-2-pyrrolidone. The negative electrode material mixture was then applied on both faces of a copper foil current collector having a thickness of 15 μm, rolled, dried, and cut to a predetermined size. This gave a negative electrode plate having a thickness of 160 μm and a weight per unit area of 1.3 g/cm$^2$.

The positive electrode plate and the negative electrode plate laid one upon the other via a polyethylene film separator were wound in a flat-sided shape to give an electrode plate assembly, which was accommodated in a rectangular case. A 1:1 (volume ratio) solvent mixture of ethylene carbonate and diethyl carbonate with LiPF$_6$ dissolved therein at the concentration of 1 mol/liter was injected as the non-aqueous electrolyte into the case. The opening of the case was closed with a sealing plate and sealed by laser welding. A resulting rectangular battery 1a had the length of 50 mm, the width of 34 mm, the thickness of 6.3 mm, and the capacity of 850 mAh.

(b) Battery 1b

The positive electrode and the negative electrode were the same as those of the battery 1a. The positive electrode plate 1 and the negative electrode 2 laid one upon the other via a polyethylene film separator were wound in a spiral form to give a cylindrical electrode plate assembly, which was accommodated in a cylindrical case.

A 1:1 (volume ratio) solvent mixture of ethylene carbonate and ethyl methyl carbonate with LiPF$_6$ dissolved therein at the concentration of 1 mol/liter was injected as the non-aqueous electrolyte into the case. The opening of the case was sealed with a sealing plate. A resulting cylindrical battery 1b had the diameter of 18 mm, the height of 65 mm, and the capacity of 1800 mAh. The content of the selective gas absorbent a in the battery 1b was 0.4 g.

(c) Battery 1c

The positive electrode material mixture was prepared in the same manner as the battery 1a, except that polyvinylidene fluoride was replaced by PVDF-HFP. This positive electrode material mixture was applied on a single face of an aluminum foil current collector having a thickness of 20 μm, rolled, dried, and cut to a predetermined size. This gave a positive electrode plate 1 having a thickness of 150 μm and a weight per unit area of 2.3 g/cm². The negative electrode plate was the same as that of the battery 1a.

One negative electrode plate was interposed between two positive electrode plates, with the face of the positive electrode material mixture inside, to assemble a stack of electrode plates. Separator layers having a thickness of about 25 μm and comprising N-methyl-2-pyrrolidone with PVDF-HFP dissolved therein were located between the positive electrode material mixture and the negative electrode material mixture. The stack of electrode plates was inserted into a bag-shaped case of a laminate sheet including a resin film and an aluminum foil.

The 1:1 (volume ratio) solvent mixture of ethylene carbonate and ethyl methyl carbonate with $LiPF_6$ dissolved therein at the concentration of 1 mol/liter was injected as the non-aqueous electrolyte into the case. The PVDF-HFP in the separator layer was gelated. The opening of the case was sealed with a thermoplastic resin. A resulting polymer battery 1c had the length of 70 mm, the width of 63 mm, the thickness of 3.6 mm, and the capacity of 1070 mAh. The content of the selective gas absorbent a in the battery 1c was 0.2 g.

(d) Batteries 2a, 2b, and 2c

A rectangular battery 2a, a cylindrical battery 2b, and a polymer battery 2c were prepared respectively under the same conditions as those of the batteries 1a, 1b, and 1c, except that the selective gas absorbent a was replaced by the selective gas absorbent b.

(e) Batteries 3a, 3b, and 3c

A rectangular battery 3a, a cylindrical battery 3b, and a polymer battery 3c were prepared respectively under the same conditions as those of the batteries 1a, 1b, and 1c, except that the selective gas absorbent a was replaced by the selective gas absorbent c.

(f) Batteries 4a, 4b, and 4c of Comparative Examples

A rectangular battery 4a, a cylindrical battery 4b, and a polymer battery 4c were prepared respectively under the same conditions as those of the batteries 1a, 1b, and 1c except that the selective gas absorbent a was replaced by the carbon material s.

(g) Batteries 5a, 5b, and 5c of Comparative Examples

A rectangular battery 5a, a cylindrical battery 5b, and a polymer battery 5c were prepared respectively under the same conditions as those of the batteries 1a, 1b, and 1c, except that the selective gas absorbent a and the carbon material s were replaced by the carbon material r.

(iv) Evaluation of Batteries

Prior to evaluation, each battery was initially charged to a voltage of 4.2 V with an electric current of 0.2 C (5-hour rate) on the basis of the theoretical capacity of the battery.

Evaluation 1

The batteries 1a, 2a, 3a, 4a, and 5a were subjected to a cycle test at 45° C. The cycle test repeated a cycle, which discharged each battery to 3.0 V with an electric current of 1 C (1-hour rate), charged the battery to 4.25 V with an electric current of 0.7 C, and further charged the battery at a fixed voltage to attain an electric current level of 0.05 C. The test then measured a variation in discharge capacity. The percent of the observed discharge capacity relative to the initial discharge capacity in the first cycle as 100% was plotted against the number of cycles. The results are shown in FIG. 18.

Figure 18:
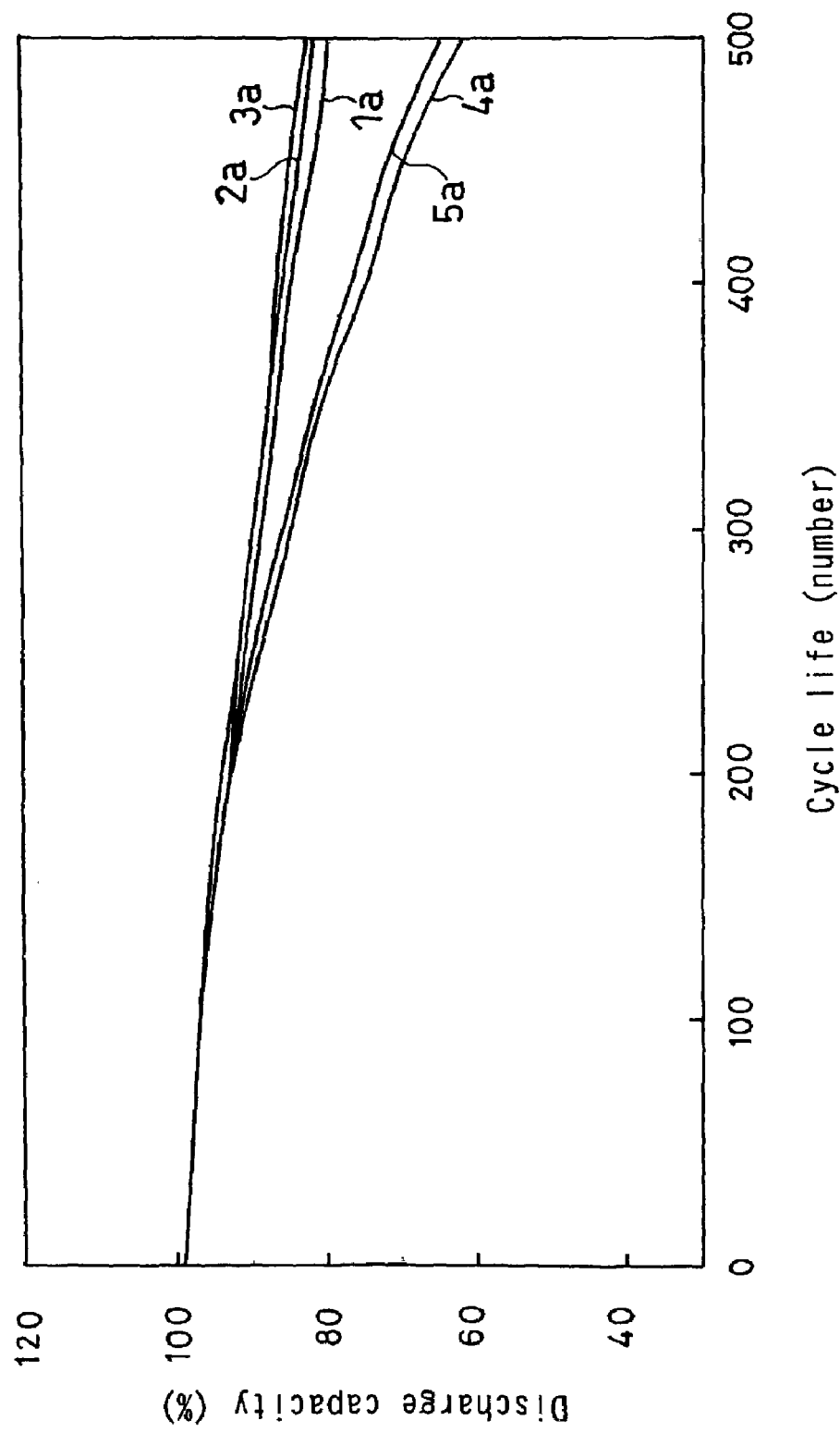
FIG. 18 is a graph showing the discharge capacity plotted against the number of charge-discharge cycles with regard to batteries of Examples and Comparative Examples.

In the graph of FIG. 18, the capacities of the batteries 4a and 5a without the selective gas absorbent were significantly lowered with the progress of the cycle. The capacities of the batteries 1a through 3a in Examples including the selective gas absorbent were, on the other hand, kept at high levels.

After the evaluation test, the battery was decomposed for observation. Gas bubbles were present between the electrode plates in the batteries 4a and 5a in Comparative Examples. The state of contact between the adjoining electrode plates was rather insufficient. In the batteries 1a through 3a in Examples, on the contrary, practically no polarization was observed. This is ascribed to the function of the selective gas absorbent, which absorbs carbon dioxide and methane in the batteries 1a through 3a. The cylindrical batteries 1b through 5b, and the polymer batteries 1c through 5c were also evaluated in the same manner. Similar tendency to that of the batteries 1a through 5a was observed in these batteries 1b through 5b and 1c through 5c.

Evaluation 2

The polymer batteries 1c through 5c were subjected to experiments 1 through 3 discussed below, and the state of each battery after the experiment was observed. In order to clarify the effects of the present invention, the safety valve was fully closed in the batteries 1c through 5c. The results are shown in Table 6.

Experiment 1: Each battery overcharged at 4.25 V was kept at 60° C. for 20 days, and the increase in thickness of the battery (bulge) was measured.

Experiment 2: Each battery was subjected to a cycle test. The cycle was repeated 20 cycles. The cycle discharged the battery to a voltage of 3.0 V with an electric current of 1 C at 20° C., charged the battery to 4.25 V with an electric current of 0.7 C, and further charged the battery at a fixed voltage to attain an electric current level of 0.05C. The increase in thickness of the battery was then measured.

Experiment 3: The same cycle test as the experiment 2 was performed, except that the environmental temperature was 45° C. The increase in thickness of the battery was measured after the cycle test.

TABLE 6

| Batteries | Experiment 1 | Experiment 2 | Experiment 3 |
| --- | --- | --- | --- |
| 1c | 0.03 mm | 0.10 mm | 0.30 mm |
| 2c | 0.01 mm | 0.05 mm | 0.20 mm |
| 3c | 0.01 mm | 0.03 mm | 0.15 mm |
| 4c | 0.70 mm | 1.10 mm | 1.60 mm |
| 5c | 0.70 mm | 1.15 mm | 1.75 mm |

As clearly shown in Table 6, the thickness was significantly increased in the batteries 4c and 5c of Comparative Examples. This shows that the internal pressure in the batteries 4c and 5c drastically increased after the experiments 1 through 3. In the batteries 1c through 3c of Examples, only a little increase in thickness was observed. The results clearly show that the selective gas absorbent in the battery effectively prevents an increase in internal pressure of the battery and thereby deformation of the battery.

As described above, the technique of the present invention utilizes the gas absorbing element that is not readily wetted with a non-aqueous solvent and ensures long-term, stable action, thus remarkably enhancing the reliability of the non-aqueous electrolyte secondary battery. The technique of the present invention also utilizes the gas absorbent that selectively absorbs methane and carbon dioxide produced inside the battery, thus remarkably enhancing the reliability of the non-aqueous electrolyte secondary battery. The principle of the present invention is effective for any non-aqueous electrolyte secondary batteries containing a non-aqueous solvent and is thus applicable to small-sized batteries used for small-sized electronic apparatuses, as well as large-sized batteries used for electronic vehicles and power reservoirs.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

The invention claimed is:

1. A non-aqueous electrolyte secondary battery, comprising: an electrode plate assembly including a positive electrode, a negative electrode, and a separator interposed between said positive electrode and said negative electrode; a non-aqueous electrolyte including a lithium salt and a non-aqueous solvent; and a separate gas absorbing element capable of absorbing gas produced in said secondary battery,
wherein said gas absorbing element comprises a gas absorbent and a lyophobic agent against said non-aqueous solvent, and
said gas absorbent comprises a carbon material with benzene chemically adsorbed thereon.

2. The non-aqueous electrolyte secondary battery in accordance with claim 1, wherein said gas absorbent is capable of absorbing at least one gas selected from the group consisting of methane, ethane, ethylene, carbon dioxide, and hydrogen.

3. The non-aqueous electrolyte secondary battery in accordance with claim 1, wherein said lyophobic agent comprises at least one selected from the group consisting of polyethylene, polypropylene, polytetrafluoroethylene, polyvinylidene fluoride, polyacrylonitrile, polyimide, copolymer of tetrafluoroethylene and hexafluoropropylene, and copolymer of styrene and butadiene.

4. The non-aqueous electrolyte secondary battery in accordance with claim 1, wherein dibutyl phthalate absorption of said lyophobic agent is not greater than 150 ml/100 g.

5. The non-aqueous electrolyte secondary battery in accordance with claim 1, wherein said gas absorbing element comprises a powdery mixture including said gas absorbent and said lyophobic agent.

6. The non-aqueous electrolyte secondary battery in accordance with claim 5, wherein a content of said lyophobic agent in said powdery mixture is 2 to 30 parts by weight per 100 parts by weight of said gas absorbent.

7. The non-aqueous electrolyte secondary battery in accordance with claim 5, wherein dibutyl phthalate absorption of said powdery mixture is not greater than 150 ml/100 g.

8. The non-aqueous electrolyte secondary battery in accordance with claim 5, wherein said gas absorbing element is either one of a molded article and a sintered article of said powdery mixture.

9. The non-aqueous electrolyte secondary battery in accordance with claim 1, wherein a difference between surface free energy of said gas absorbing element and surface free energy of said non-aqueous electrolyte is 5 to 50 mN/m at 20° C.

10. The non-aqueous electrolyte secondary battery in accordance with claim 1, wherein said gas absorbing element has a porous layer preventing said gas absorbent from being wetted excessively by said non-aqueous electrolyte, and said porous layer comprises said lyophobic agent.

11. The non-aqueous electrolyte secondary battery in accordance with claim 10, wherein a difference between surface free energy of said porous layer and surface free energy of said non-aqueous electrolyte is 5 to 50 mN/m at 20° C.

12. The non-aqueous electrolyte secondary battery in accordance with claim 1, wherein said gas absorbing element comprises a coating film formed on a surface of a constituent of said battery, said coating film comprising said gas absorbent and said lyophobic agent.

13. The non-aqueous electrolyte secondary battery in accordance with claim 1, wherein said gas absorbing element comprises a coating film formed on a surface of a constituent of said battery and a porous layer covering said coating film, said coating film comprising said gas absorbent, and said porous layer comprising said lyophobic agent.

14. The non-aqueous electrolyte secondary battery in accordance with claim 1, wherein said electrode plate assembly is wound, and said gas absorbing element is serving as a core of said wound electrode plate assembly.

15. The non-aqueous electrolyte secondary battery in accordance with claim 1, wherein said gas absorbing element is fixed to a sealing plate, said sealing plate sealing an opening of a casing for accommodating said electrode plate assembly therein.

16. A non-aqueous electrolyte secondary battery, comprising: an electrode plate assembly including a positive electrode, a negative electrode, and a separator interposed between said positive electrode and said negative electrode; a non-aqueous electrolyte including a lithium salt and a non-aqueous solvent; and a separate gas absorbing element capable of absorbing gas produced in said secondary battery,
wherein said gas absorbing element comprises a gas absorbent capable of selectively absorbing at least one selected from the group consisting of carbon dioxide and methane, and
said gas absorbent comprises a carbon material with benzene chemically adsorbed thereon.

17. The non-aqueous electrolyte secondary battery in accordance with claim 16, wherein dibutyl phthalate absorption of said gas absorbent is not greater than 150 ml/100 g.

18. The non-aqueous electrolyte secondary battery in accordance with claim 16, wherein said gas absorbent has a specific surface area of 300 to 1500 $m^2$/g, and a ratio of number of oxygen atoms to number of carbon atoms: O/C ratio in said gas absorbent, is not greater than 0.1.

19. The non-aqueous electrolyte secondary battery in accordance with claim 16, wherein said gas absorbent after subjected to 2-hour degasification at 400° C is capable of absorbing carbon dioxide, methane, or a gaseous mixture of carbon dioxide and methane by a volume of at least 10 times that of the air.

20. The non-aqueous electrolyte secondary battery in accordance with claim 16, wherein said gas absorbent after subjected to absorption of the air to a saturated level in a $1\times10^5$ Pa atmosphere of the air at 25° C. is capable of absorbing carbon dioxide, methane, or a gaseous mixture of carbon dioxide and methane at a rate of at least 100 ml per gram in a $1\times10^5$ Pa atmosphere of carbon dioxide, methane, or said gaseous mixture of carbon dioxide and methane at 25° C.

21. The non-aqueous electrolyte secondary battery in accordance with claim 16, a weight decreasing rate at 100° C. of said gas absorbent after subjected to 2-hour degasification at 400° C. and subsequent absorption of carbon dioxide to a saturate level in a $1\times10^5$ Pa atmosphere of carbon dioxide at 25° C., in a flow of Ar by differential thermal analysis is not greater than 10% of a weight decreasing rate at 500° C.

22. The non-aqueous electrolyte secondary battery in accordance with claim 16, wherein a content of said gas absorbent in said battery is not less than 0.2 g per 1000 mAh of cell capacity.

23. The non-aqueous electrolyte secondary battery in accordance with claim 1, wherein said gas absorbent comprises a carbon material obtained by heating a carbon powder in an benzene atmosphere at 600 to 1000° C., so as to make benzene chemically adsorbed on said carbon powder.

* * * * *